United States Patent
Miao et al.

(10) Patent No.: US 7,744,670 B2
(45) Date of Patent: Jun. 29, 2010

(54) CONTROLLED PORE SIZE DISTRIBUTION POROUS CERAMIC HONEYCOMB FILTER, HONEYCOMB GREEN BODY, BATCH MIXTURE AND MANUFACTURING METHOD THEREFOR

(75) Inventors: Weiguo Miao, Big Flats, NY (US); Paul John Shustack, Elmira, NY (US); Jennifer Lynn Skolny, Corning, NY (US); Jianguo Wang, Horseheads, NY (US); Yuming Xie, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 738 days.

(21) Appl. No.: 11/606,797

(22) Filed: Nov. 30, 2006

(65) Prior Publication Data

US 2007/0119135 A1    May 31, 2007

Related U.S. Application Data

(60) Provisional application No. 60/741,355, filed on Nov. 30, 2005.

(51) Int. Cl.
*B01D 39/06* (2006.01)
*B01D 24/00* (2006.01)
*B01D 39/14* (2006.01)
*B01D 50/00* (2006.01)
*F01N 3/00* (2006.01)
*F01N 3/10* (2006.01)
*F01N 3/08* (2006.01)

(52) U.S. Cl. ............... 55/523; 55/522; 55/524; 60/297; 502/303; 422/172; 422/173; 422/174; 422/175; 422/176; 422/177; 422/178; 422/179; 422/180

(58) Field of Classification Search ........... 55/522–524; 60/297; 502/303; 422/172–180
See application file for complete search history.

(56) References Cited

U.S. PATENT DOCUMENTS

| | | | | |
|---|---|---|---|---|
| 2,185,859 A | * | 1/1940 | Massey | 162/184 |
| 4,329,162 A | | 5/1982 | Pitcher, Jr. | 55/523 |
| 4,390,355 A | | 6/1983 | Hammond, Jr. et al. | 55/523 |
| 4,414,337 A | | 11/1983 | Ichikawa et al. | 501/103 |

(Continued)

FOREIGN PATENT DOCUMENTS

WO    2006/030811    3/2006

OTHER PUBLICATIONS

U.S. Appl. No. 60/686,117, Brady et al., filed May 31, 2005.

*Primary Examiner*—Walter D Griffin
*Assistant Examiner*—Amber Orlando
(74) *Attorney, Agent, or Firm*—Matthew B. McNutt

(57) ABSTRACT

A porous ceramic honeycomb filter manufactured from an oxide-based ceramic material having a pore size distribution with $d_1 \geq 7.0$ microns. Preferably, the oxide-based material is cordierite or aluminum titanate. Alternatively, the filter contains a cordierite-containing ceramic body with a narrow pore size distribution with $d_b \leq 1.00$, wherein $d_b = (d_{90} - d_{10})/d_{50}$. Also disclosed is a batch mixture, method and honeycomb green body made from mixture of inorganic source materials selected from the group of magnesia sources, alumina sources, and silica sources, and a pore former having a narrow particle size distribution with $d_{ps} \leq 0.90$, wherein $d_{ps} = \{(dp_{90} - dp_{10})/dp_{50}\}$. The pore former is preferably selected from a group consisting of canna starch, sago palm starch, green mung bean starch, and single-mode potato starch.

70 Claims, 11 Drawing Sheets

U.S. PATENT DOCUMENTS

| | | |
|---|---|---|
| 4,416,676 A | 11/1983 | Montierth .................... 55/523 |
| 4,509,966 A | 4/1985 | Dimick et al. ................ 55/502 |
| 4,557,773 A | 12/1985 | Bonzo et al. .................. 156/64 |
| 4,840,827 A | 6/1989 | Mizutani et al. ............ 428/116 |
| 5,069,697 A | 12/1991 | Hamaguchi et al. ........... 55/523 |
| 5,185,110 A | 2/1993 | Hamaguchi et al. ........... 264/44 |
| 5,258,150 A | 11/1993 | Merkel et al. ................ 264/43 |
| 5,545,243 A | 8/1996 | Kotani et al. ................. 55/523 |
| 5,762,895 A | 6/1998 | Schwetz et al. ............. 423/345 |
| 6,080,348 A | 6/2000 | Shalkey ................. 264/177.12 |
| 6,413,895 B1 | 7/2002 | Merkel ........................ 501/134 |
| 6,541,407 B2 | 4/2003 | Beall et al. ................. 501/119 |
| 6,773,481 B2 * | 8/2004 | Noguchi et al. ............. 55/523 |
| 6,800,108 B2 | 10/2004 | Noda ......................... 55/523 |
| 6,803,086 B2 | 10/2004 | Noguchi et al. ............. 428/116 |
| 6,814,774 B2 | 11/2004 | Ishihara et al. ................ 55/523 |
| 6,864,198 B2 | 3/2005 | Merkel ........................ 501/80 |
| RE38,888 E | 11/2005 | Beall et al. .................. 501/119 |
| 2003/0039598 A1 | 2/2003 | Nishimura et al. .......... 422/177 |
| 2003/0041574 A1 * | 3/2003 | Noguchi et al. ............... 55/523 |
| 2003/0073572 A1 * | 4/2003 | Parrillo et al. ............... 502/150 |
| 2004/0029707 A1 | 2/2004 | Beall et al. .................. 501/119 |
| 2004/0148916 A1 * | 8/2004 | Merkel ........................ 55/523 |
| 2004/0152593 A1 | 8/2004 | Cutler et al. ................ 502/439 |
| 2004/0261384 A1 | 12/2004 | Merkel et al. ................ 55/523 |
| 2006/0021308 A1 * | 2/2006 | Merkel ........................ 55/523 |
| 2006/0021309 A1 * | 2/2006 | Merkel ........................ 55/523 |
| 2007/0006561 A1 * | 1/2007 | Brady et al. .................. 55/523 |
| 2007/0107397 A1 * | 5/2007 | Merkel et al. ................ 55/523 |
| 2007/0119133 A1 * | 5/2007 | Beall et al. .................... 55/523 |
| 2007/0214759 A1 * | 9/2007 | Merkel ........................ 55/523 |

* cited by examiner

CONTROLLED PORE SIZE DISTRIBUTION POROUS CERAMIC HONEYCOMB FILTER, HONEYCOMB GREEN BODY, BATCH MIXTURE AND MANUFACTURING METHOD THEREFOR

RELATED INVENTIONS

The present invention claims the benefit of U.S. Provisional Application No. 60/741,355 filed Nov. 30, 2005 and entitled "Controlled Pore Size Distribution Porous Ceramic Honeycomb Filter, Honeycomb Green Body, Batch Mixture And Manufacturing Method Therefor."

FIELD OF THE INVENTION

The present invention relates to a porous ceramic honeycomb article and honeycomb green body, batch mixture and method of manufacturing therefor. More particularly, the present invention relates to porous ceramic honeycomb filters exhibiting controlled pore size distribution and manufacture thereof.

BACKGROUND OF THE INVENTION

Recently much interest has been directed towards diesel engines due to their inherent fuel efficiency and durability. However, diesel emissions have come under attack both in the United States and Europe, as being generally undesirable. As such, stricter environmental regulations will require diesel engines to meet higher emissions standards. Therefore, diesel engine manufacturers and emission-control companies are working to achieve diesel engines that are cleaner and meet the most stringent emission requirements under all operating conditions with minimal cost to the consumer.

One of the biggest challenges in lowering diesel emissions is controlling the levels of particulates present in the diesel exhaust stream. Diesel particulates are mainly composed of carbon soot. One way of removing such soot from diesel exhausts is through use of diesel filters. The most widely-used diesel filter is a diesel particulate filter (sometimes referred to as a "wall flow filter") which filters the diesel exhaust by capturing the soot on or in its porous walls. The diesel particulate filter is designed to provide excellent soot filtration without significantly hindering the exhaust flow, i.e., without creating significant unwanted back pressure.

Within the industry, Silicon Carbide (SiC) has been used for certain diesel particulate filters. However, SiC is expensive, heavy and has a relatively high coefficient of thermal expansion (CTE). Thus, the use of SiC materials in diesel particulate filters requires expensive multi-component designs (sometimes referred to as segmented designs) to overcome the material's high CTE. Accordingly, single component designs and designs utilizing generally less expensive cordierite materials are sought.

Generally, diesel particulate filters include alternate cell channels plugged on opposite faces to force the engine exhaust gas to pass through the porous walls of the filter. Such filters typically include a catalyst coating, such as an oxidation catalyst, on their surface. Various particulate filters are described in U.S. Pat. Nos. 4,329,162; 4,390,355; 4,416,676; 4,509,966; and 4,840,827, for example.

As the layer of soot collects on the surfaces of the inlet channels of the particulate filter, the lower permeability of the soot layer causes a gradual rise in the back pressure of the filter against the engine (soot loaded back pressure), causing the engine to work harder. Once the soot in the filter has accumulated to some level, the filter must be regenerated by burning out the soot, thereby restoring the back pressure again to lower levels. However, the coated filter (and coated back pressure drop) sets the floor for how "low" the back pressure can be made to be. Thus, it should be recognized that wash coating of the filter raises the back pressure as compared to an uncoated filter. Moreover, it should also be recognized that the contribution of the uncoated filter to the overall back pressure is not insignificant.

Thus, it should be recognized that a significant problem associated with diesel particulate filters is backpressure. Moreover, the coated pressure drop may exceed the uncoated pressure drop by a significant margin. Thus, it would be considered a significant advancement to obtain a particulate filter which has lower wash-coated pressure drop, such that the back pressure against the engine remains low. Furthermore, any across-the-board reduction in the uncoated pressure drop would also be desirable. These backpressure reductions should be accomplished while retaining good filtration efficiency, strength and thermal shock resistance in the diesel particulate filter.

SUMMARY OF THE INVENTION

According to a first aspect, the present invention is a porous ceramic honeycomb filter manufactured of an oxide-based ceramic material which exhibits a very small amount of small pores. In particular, the porous ceramic honeycomb filter, preferably comprises an oxide-based material selected from a group of cordierite and aluminum titanate. More particularly, the oxide-based material has many pores with a pore size distribution wherein $d_1 \geq 7.0$ μm. $d_1$ is defined herein as a pore diameter wherein 1% of a total pore volume of the pore size distribution has a smaller diameter (as measured by a mercury porosimetry method). Having $d_1 \geq 7$ μm significant lowers the wash-coated pressure drop, in that small pores, which may become clogged, are minimized. In a preferred embodiment, the porous ceramic honeycomb filter comprises a diesel particulate filter. In several exemplary embodiments described herein, the oxide-based material contains cordierite, preferably with a cordierite phase approximating a stoichiometry of $Mg_2Al_4Si_5O_{18}$. In other embodiments, the oxide-based material is an aluminum titanate material. In some exemplary embodiments, $d_1 \geq 8.0$ μm, or even $d_1 \geq 9.0$ μm thereby further minimizing the relative amount of small pores.

According to further embodiments of the invention, a honeycomb green body is provided, said green body includes a mixture of inorganic source materials selected from the group of a magnesia source, an alumina source, and a silica source, and a pore former having a particle size distribution with $d_{ps} \leq 0.90$, wherein $d_{ps} = \{(dp_{90} - dp_{10})/dp_{50}\}$. The green body includes a honeycomb structure with a plurality of aligned channels. $dp_{10}$ is a particle size wherein 10% of the particle volume has a smaller particle size. $dp_{50}$ is a median particle size wherein 50% of the particle volume has a smaller particle size. $dp_{90}$ is a particle size wherein 90% of the particle volume has a smaller particle size. Most preferably, the mixture of inorganic source materials includes at least two selected from the group of a magnesia source, an alumina source, and a silica source. According to additional embodiments, $d_{ps} \leq 0.85$; or even $d_{ps} \leq 0.80$ providing an even narrower particle size distribution. Utilizing narrow particle size distributions in the pore former narrows the overall pore size distribution of the ceramic articles thus produced and/or may assist in producing articles with relatively fewer small pores.

According to further embodiments of the invention, a batch mixture is provided for a forming a porous ceramic honeycomb article. The batch mixture comprises a mixture of inorganic material sources and a pore former. The pore former has a narrow particle size distribution, with $d_{ps} \leq 0.90$ wherein $$d_{ps}=(dp_{90}-dp_{10})/dp_{50}.$$

$dp_{10}$, $dp_{50}$ and $dp_{90}$ are as described above. According to further embodiments, even narrower particle size distributions are provided wherein $d_{ps} \leq 0.85$, or even $d_{ps} \leq 0.80$. Additionally, the pore former is preferably single-moded; and more preferably a starch. More preferably yet, the starch pore former is selected from a group of starches consisting of canna starch, sago palm starch, green mung bean starch, and single-mode potato starch. Such starches enable narrow pore size distributions and/or small amounts of small pores in the porous ceramic honeycomb article produced. The pore former is preferably included in an amount of between 5-30 wt. % of the organic material sources; and more preferably between 5-15 wt. %

According to additional embodiments of the invention, a batch mixture for a forming a porous ceramic honeycomb article is provided. The batch mixture comprises a mixture of inorganic material sources and a starch pore former selected from a group of pore formers consisting of canna starch, sago palm starch, green mung bean starch, and single-mode potato starch. By using these starches, which are preferably single-moded starches, a desired level of porosity may be achieved in the ceramic honeycomb article while using relatively less pore former than when graphite is used. According to preferred embodiments of the invention, the sources of inorganic materials include at least two selected from a group consisting of a magnesia source, an alumina source, a silica source, and a titania source.

In another aspect of the invention, a method of manufacturing a honeycomb article is provided, comprising the steps of mixing inorganic material sources and a pore former with forming aids to form a plasticized batch, wherein the pore former has a particle size distribution with $d_{ps} \leq 0.9$ wherein $d_{ps}$ is defined by the relation:

$$d_{ps}=(dp_{90}-dp_{10})/dp_{50}.$$

Again, $dp_{10}$, $dp_{50}$ and $dp_{90}$ are as defined above. The plasticized batch is then formed into the honeycomb article, such as by an extrusion process.

According to yet further embodiments of the invention, a porous ceramic honeycomb filter is provided, comprising a cordierite-containing ceramic body having an inlet end and an outlet end, and a multiplicity of cell channels at least partially defined by porous cell walls, said walls extending from the inlet end to the outlet end, wherein some of the cell channels are plugged, said porous cell walls including a cordierite material with many pores and having a pore size distribution with $d_b \leq 1.00$, wherein $d_b=(d_{90}-d_{10})/d_{50}$. $d_{10}$ is a pore size wherein 10% of the pore volume has a smaller pore diameter, $d_{50}$ is a median pore size wherein 50% of the pore volume has a smaller pore diameter, and $d_{90}$ is a pore size wherein 90% of the pore volume has a smaller pore diameter (as measured by mercury porosimetry). In further embodiments, the pore size distributions are even narrower wherein $d_b \leq 0.90$; $d_b \leq 0.85$; or even $d_b \leq 0.75$. In most preferred embodiments, the porosity (P) is characterized by $P \geq 40\%$; and more preferably $P \leq 65\%$; and in some embodiments $55\% \geq P \geq 40\%$. Further cordierite-containing embodiments include both narrow overall pore size distribution in that $d_b \leq 1.00$, and small amounts of small pores wherein $d_1 \geq 7.0$ µm. In addition, such cordierite-containing embodiments may include small-sized portions of the distribution having narrow pore size distributions wherein $d_f \leq 0.35$; wherein $d_f=(d_{50}-d_{10})/d_{50}$ and wherein $d_{10}$ and $d_{50}$ are as described above. In some embodiments, exceedingly narrow small-sized portions are provided wherein $d_f \leq 0.30$, or $d_f \leq 0.28$; or even $d_f \leq 0.25$.

DETAILED DESCRIPTION OF THE INVENTION

Figure 1:
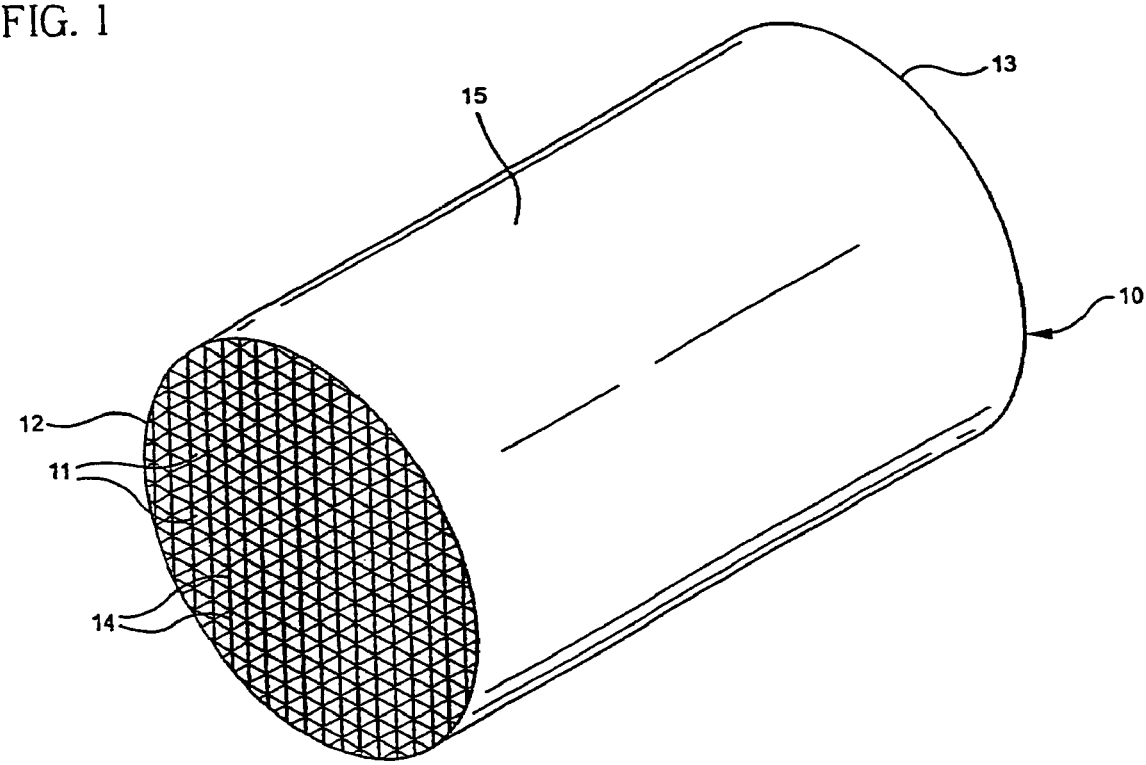
FIG. 1 illustrates a perspective view of a honeycomb green body according to embodiments of the invention.

The present invention, according to a first aspect, relates to a porous ceramic honeycomb filter article which exhibits a very small amount of small pores. More preferably, the porous ceramic honeycomb filter article includes both a very small amount of small pores and also a narrow pore size distribution. In a preferred implementation, the invention relates to a porous ceramic honeycomb filter, most useful as a diesel particulate filter. Particulate filters are useful, as described above, for filtering particulate soot from exhaust streams, for example.

According to this first aspect, the inventors herein have recognized and discovered that controlling the size of the pores below $d_1$ is an important factor in terms of being able to minimize the wash-coated pressure drop. In particular, controlling the size of the pores below $d_1$ was discovered to have a dominant contribution to reducing the percentage of wash-coated pressure drop increase (i.e., the delta in back pressure between an uncoated and wash coated filter, referred to herein as "$\Delta P_c$ %.") The increase attributable to $d_1$ is much more dominant than that due to $d_3$, $d_6$ or $d_{10}$, for example. Therefore, according to this aspect of the invention, the porous ceramic honeycomb filter preferably has walls made up of an oxide-based material having a pore size distribution exhibiting $d_1 \geq 7.0$ microns. $d_1$ as used herein is defined as the pore diameter where 1% of the volume of the pore distribution of total volume of pores have a smaller pore diameter (as measured by mercury porosimetry). Thus, according to this aspect, 1% of the volume of pores have a pore diameter of less than or equal to 7.0 µm. This has the direct advantage of minimizing $\Delta Pc$ % in that the only a small amount of small pores exist in the uncoated honeycomb filter's walls. Small pores have a propensity to be clogged by the wash coating which is applied to the filter as part of its normal processing to add a catalyst to the filter, such as a diesel oxidation catalyst. Thus, substantially reducing the relative amount of small pores in the walls of the filter structure, i.e., those preferably below 7.0 µm, dramatically reduces wash-coated backpressure increase.

It should also be recognized that this aspect of the invention has the most applicability to oxide-based ceramic materials, such as materials selected from the group of cordierite and aluminum titanate. Examples of these materials are shown in Tables 2-5 below. Other cordierite-containing embodiments of the invention, as best described in Tables 2 and 3 below, achieve $d_1$ of greater than or equal to 8.0 µm, or even greater than or equal to 9.0 µm, for example. Thus, such materials have even less propensity to have clogged pores upon wash coating and, therefore, lower wash-coated pressure increase, $\Delta P_c \%$.

The wash-coated pressure increase, $\Delta P_c \%$, is defined herein as:

$$\Delta P_c\% = \{(P_{coated} - P_{uncoated})/P_{uncoated}\} \times 100$$

Utilizing this aspect of the present invention preferably produces a porous wash coated ceramic filter with a wash-coated pressure increase, $\Delta P_c \%$, of less than about 100%, for example. Thus, to achieve the advantage of reduced wash-coated pressure increase, the porous walls of the filter should include a pore size distribution with precisely-controlled $d_1$.

In addition to the benefits achieved by controlling the amount of small pores, it is also beneficial to control the pore size distribution of the oxide-based material used for the cell walls of the filter. Providing narrow pore distribution improves filtration efficiency by reducing the percentage of relatively large pores. It also improves the strength of the filter article. Thus, according to another aspect of the invention, the overall breadth, $d_b$, of the pore size distribution should also be controlled to be relatively narrow. Thus, according to another broad aspect of the invention, an exceedingly narrow pore size distribution is provided. The pore distribution breadth, $d_b$, is used herein to measure and characterize the overall breadth, i.e., the overall narrowness of the pore size distribution of the filter's wall material. The overall breadth, $d_b$, is given by the following relationship:

$$d_b = (d_{90} - d_{10})/d_{50}$$

wherein $d_{10}$ is a pore diameter wherein 10% of the pore volume has a smaller pore diameter, $d_{50}$ is a median pore diameter wherein 50% of the pore volume has a smaller pore diameter, and $d_{90}$ is a pore diameter wherein 90% of the pore volume has a smaller pore diameter.

In more detail, as shown and described in Tables 2 and 3 below, certain cordierite-containing embodiments are disclosed which achieve ultra narrow breadth, $d_b$. More particularly, $d_b \leq 1.00$ is achieved by numerous examples described herein. Some embodiments achieve even narrower breadth with $d_b \leq 0.90$ (see Ex. 2-6, 14). Still other embodiments exhibit breadth characterized by $d_b \leq 0.85$ (see Ex. 3-5), or even $d_b \leq 0.75$ (see Ex. 4). An aluminum titanate example according to embodiments of the invention exhibiting $d_b \leq 0.80$ or even $d_b \leq 0.75$ is described in Tables 4-5.

In another broad aspect of the invention, even the smaller sized portion of the pore size distribution (that portion of the distribution equal to and below $d_{50}$) is preferably also controlled to be relatively narrow. The so-called "d-factor," $d_f$, is utilized herein to measure and characterize the narrowness of the smaller pore size portion of the pore size distribution. The d-factor, $d_f$, is given by the following equation:

$$d_f = (d_{50} - d_{10})/d_{50}$$

wherein $d_{10}$ and $d_{50}$ are as described above.

Many cordierite-containing embodiments described herein also exhibit a d-factor, $d_f$, wherein $d_f \leq 0.38$ (see Ex. 1-7, and 9-14). Such narrow pore size distribution may lower the overall pressure drop when the material is utilized to form the walls in a particulate filter (both coated and uncoated); an example filter being shown and described with reference to FIG. 2. Still further embodiments of the invention exhibit $d_f \leq 0.35$ (see Ex. 1-6, 9-14), or even $d_f \leq 0.30$ (see Ex. 4-6, 10 and 14). Examples 4-6, 10 and 14 of Tables 2 and 3 exhibit $d_f \leq 0.28$. One particularly narrow embodiment (Ex. 4) exhibits $d_f \leq 0.26$.

In addition, the mean pore size of the oxide-based porous material forming the cell walls of the ceramic honeycomb filter is preferably between 13 and 33 microns; more preferably between 15-30 microns; and in many embodiments, between 15-25 microns. Moreover, the oxide-based filter material preferably also includes a total volume percent porosity, P, as measured by mercury porosimetry, characterized by $P \geq 40\%$; more preferably $P \leq 65\%$; and most preferably $40\% \leq P \leq 65\%$, or even $40\% \leq P \leq 55\%$. This level of porosity provides good soot filtration and provides adequate heat capacity for most exhaust filtration applications.

According to certain exemplary embodiments of the invention, as shown in Tables 2-3, the walls of the honeycomb filter article are manufactured from an oxide-based material which contains a predominantly cordierite. More preferably yet, the phase preferably approximates a stoichiometry approximating $Mg_2Al_4Si_5O_{18}$. In other embodiments, the structure contains a predominately aluminum titanate (see example in Tables 4-5 below).

When the oxide-based material comprises a predominantly cordierite phase, it should be understood that a limited substitution of other constituents such as Fe (iron), Co (cobalt), Ni (nickel), and Mg (manganese) for the Mg (magnesium), Ga (gallium) for the Al (aluminum), and Ge (germanium) for the Si (silicon) is acceptable. Further, the cordierite phase may contain up to three atoms of an alkali (Group IA) metal, two atoms of an alkaline earth metal (Group IIA), or one atom of a rare earth metal (scandium, yttrium, or a lanthanide metal) per 54 oxygens. These substituents would be expected to occupy the normally vacant "channel sites" in the crystal structure of the cordierite-type phase, although their limited substitution for Mg might also occur. Incorporation of these elements into the cordierite crystal structure may be coupled with other chemical substitutions, such as a change in Al/Si ratio, to preserve charge balance.

The batch composition and properties of various examples of such cordierite-containing materials are illustrated in Tables 2 and 3 below, respectively (see Examples No. 1-14). According to preferred embodiments of the inventive porous ceramic honeycomb filter, cordierite materials are employed which exhibit narrow pore size distribution and pore sizes within a defined range. In particular, the pore size distributions for the inventive filter materials preferably includes a pore structure having $d_{10} \geq 10$ µm; more preferably $d_{10} \geq 12$ µm. Additionally, the pore structure is preferably such that $d_{90} \leq 45$ µm; more preferably $d_{90} \leq 35$ µm. The mean pore diameter, $d_{50}$, for these materials is preferably at least 10 µm and less than 40 µm; more preferably between 13 µm and 33 µm. Many embodiments exhibit mean pore size of between 15 µm and 30 µm; or even between 15 µm and 25 µm. Further embodiments may exhibit a narrow pore size distribution wherein porosity attributable to pores having a pore size less than 10 µm is less than 6%, and the porosity being attributable to pores having a pore size larger than 50 µm is less than 8%.

Figure 11:
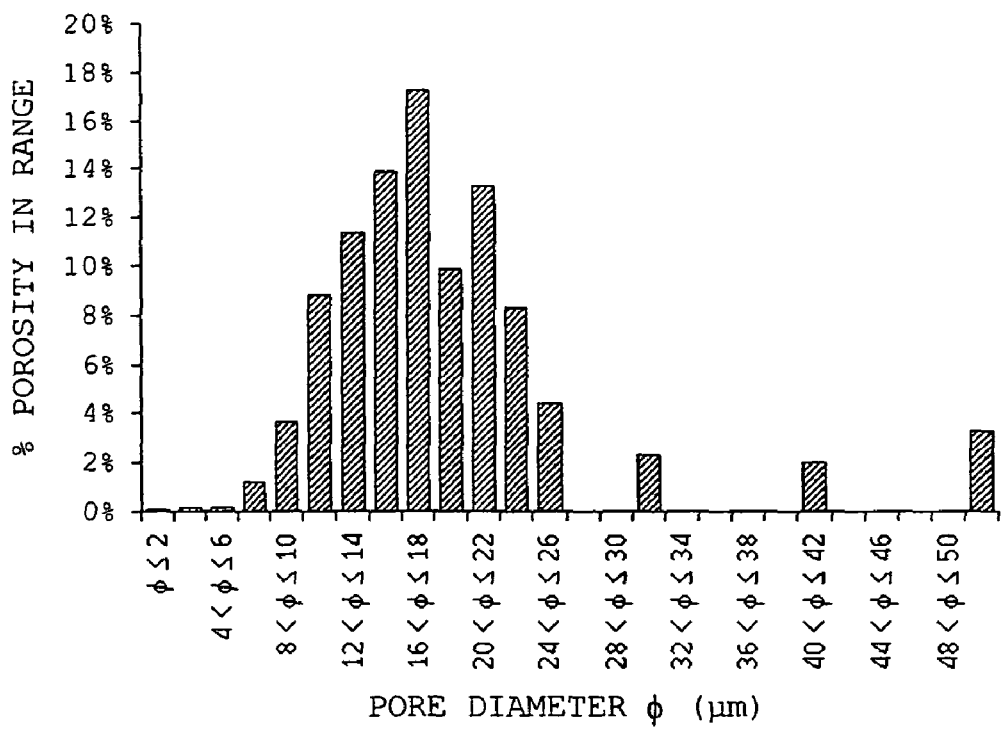
FIGS. 11-19 illustrate graphs of pore size distributions for several exemplary porous ceramic honeycomb filters according to embodiments of the invention.
Figure 12:
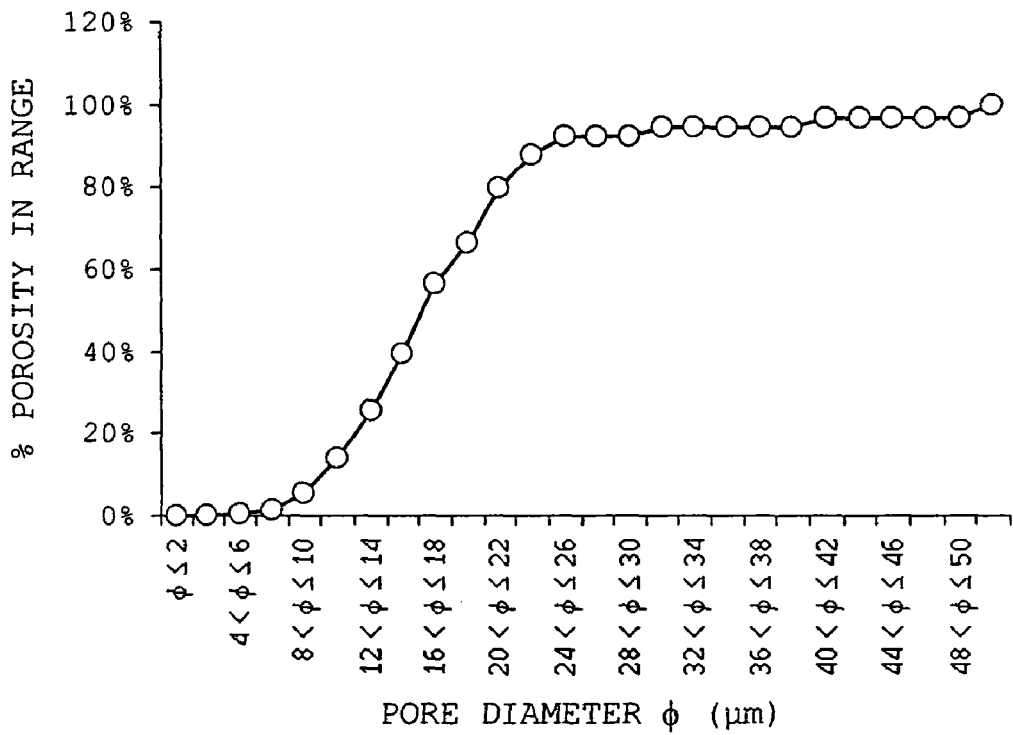
Figure 13:
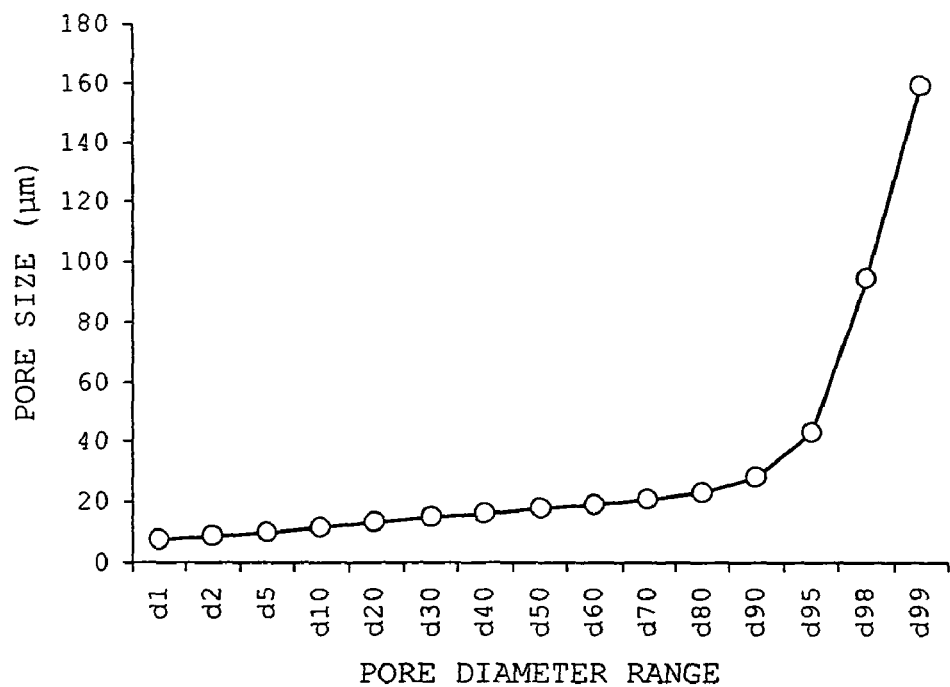
Figure 14:
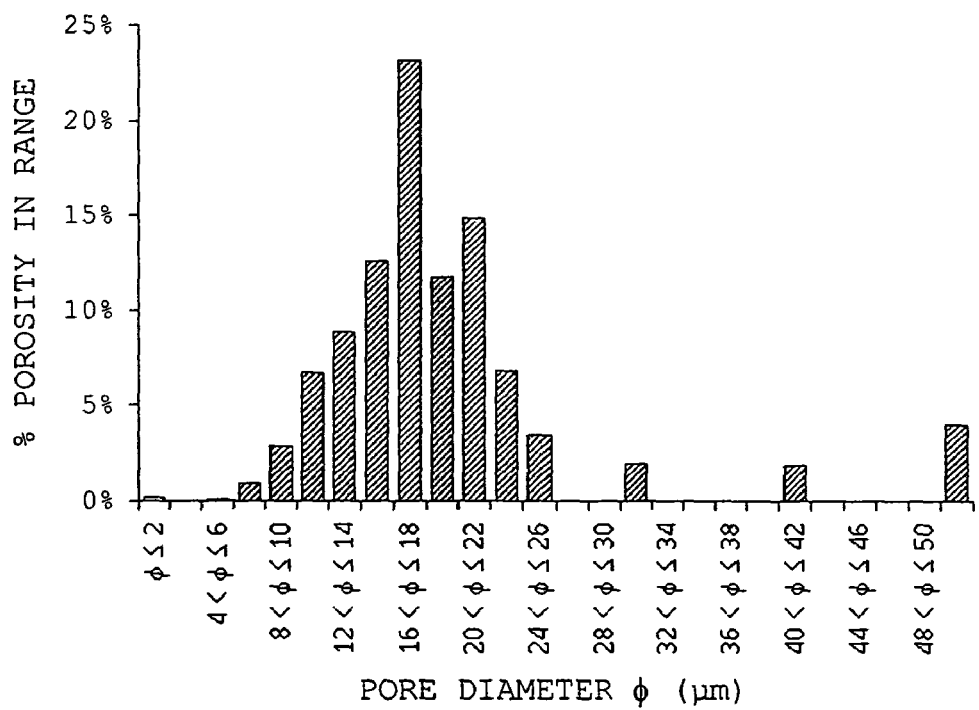
Figure 15:
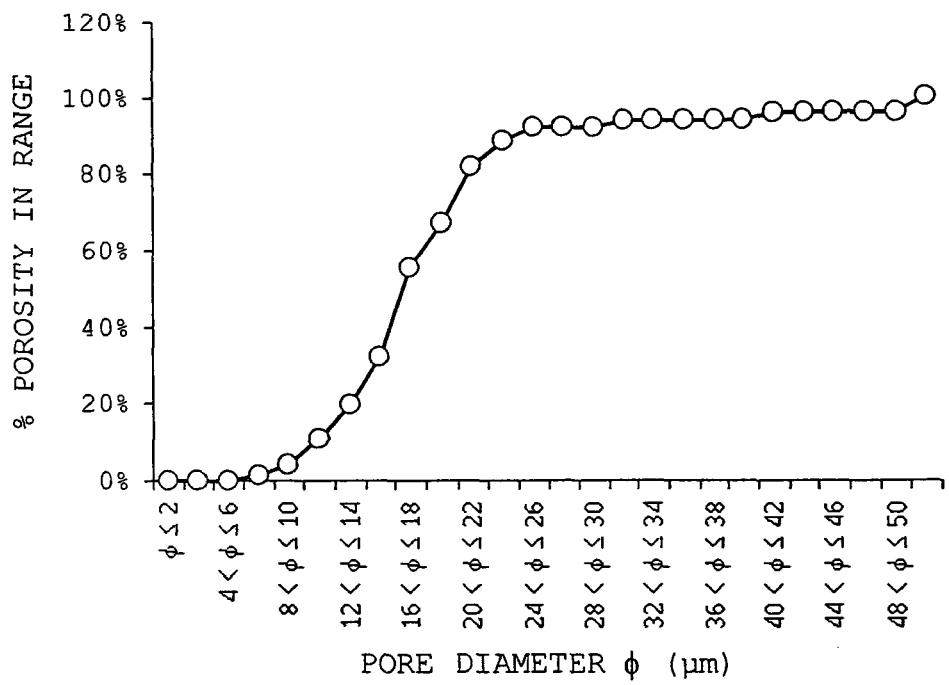
Figure 16:
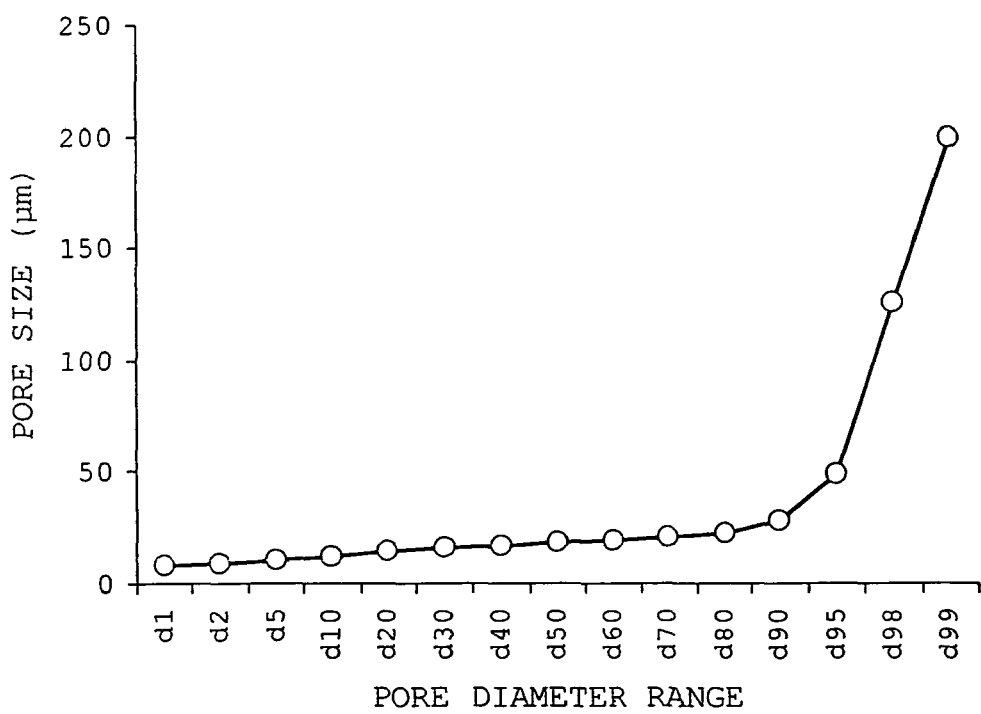
Figure 17:
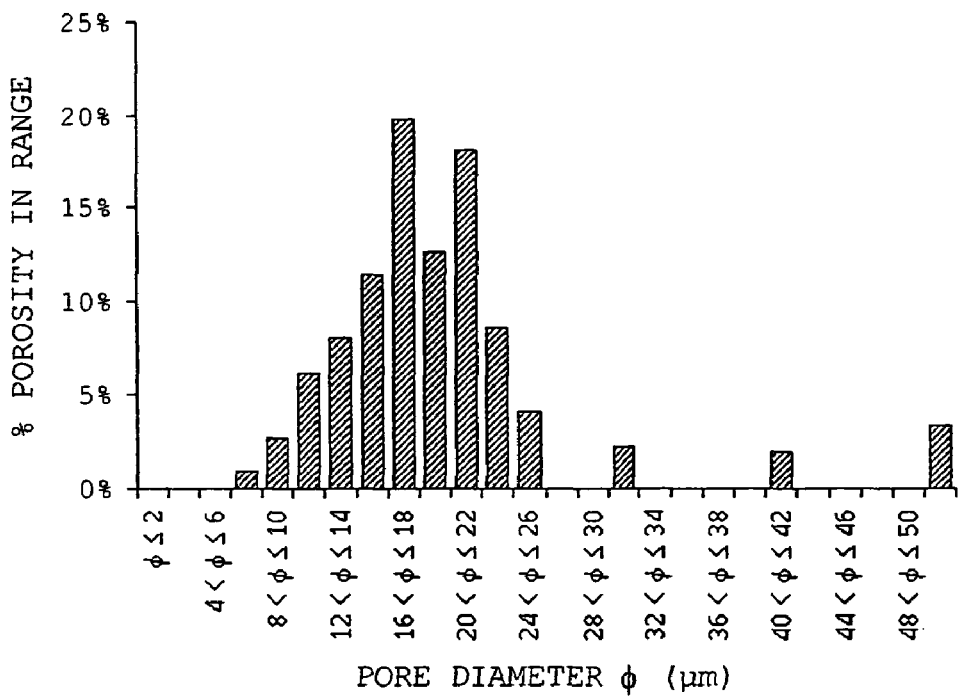
Figure 18:
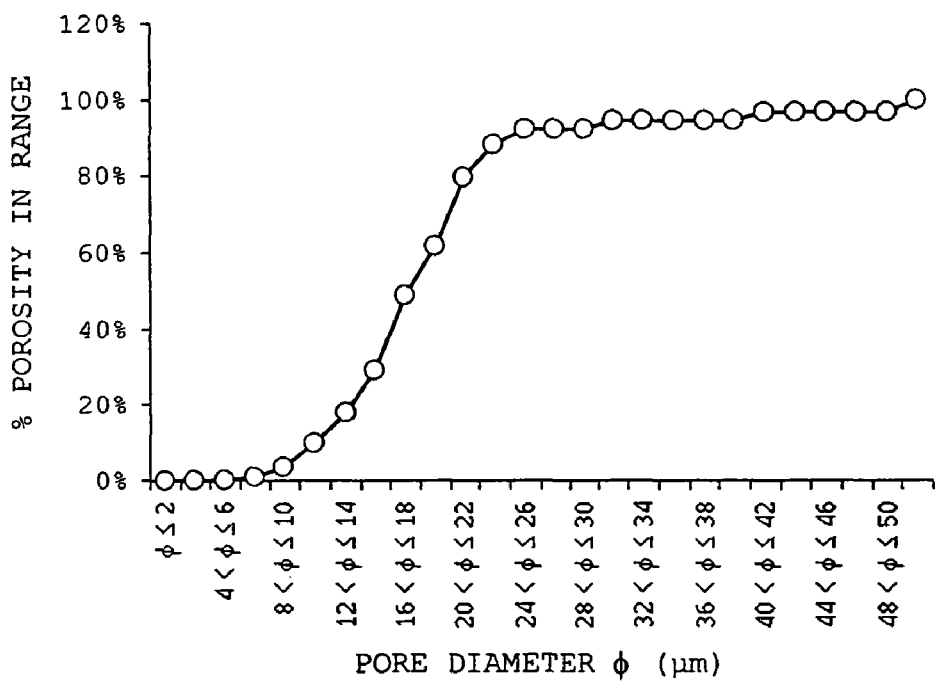
Figure 19:
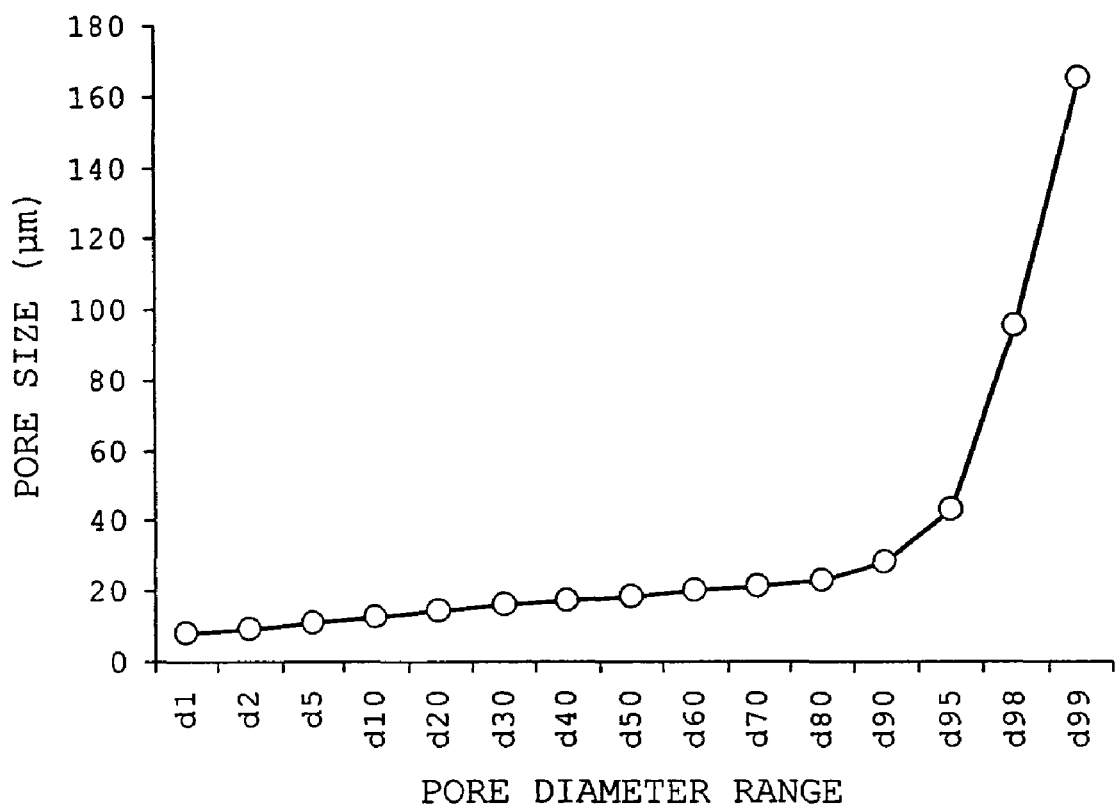
Figure 20:
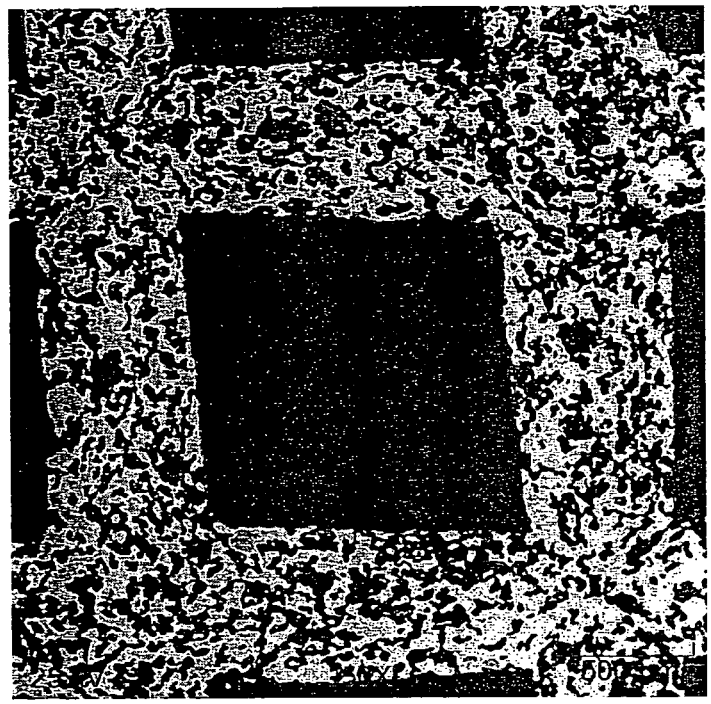
FIGS. 20-23 illustrate various micrographs of the internal pore structure of the porous wall of the filters according to embodiments of the invention.
Figure 21:
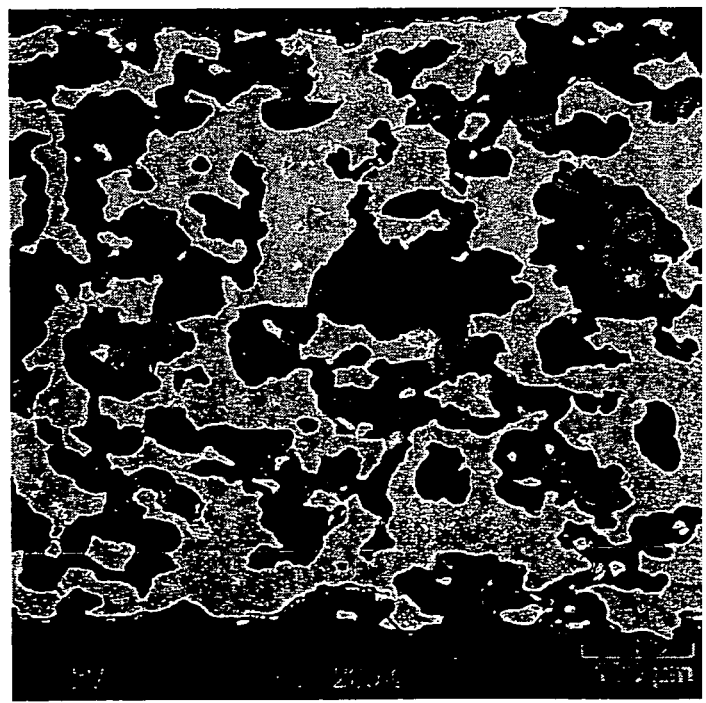
Figure 22:
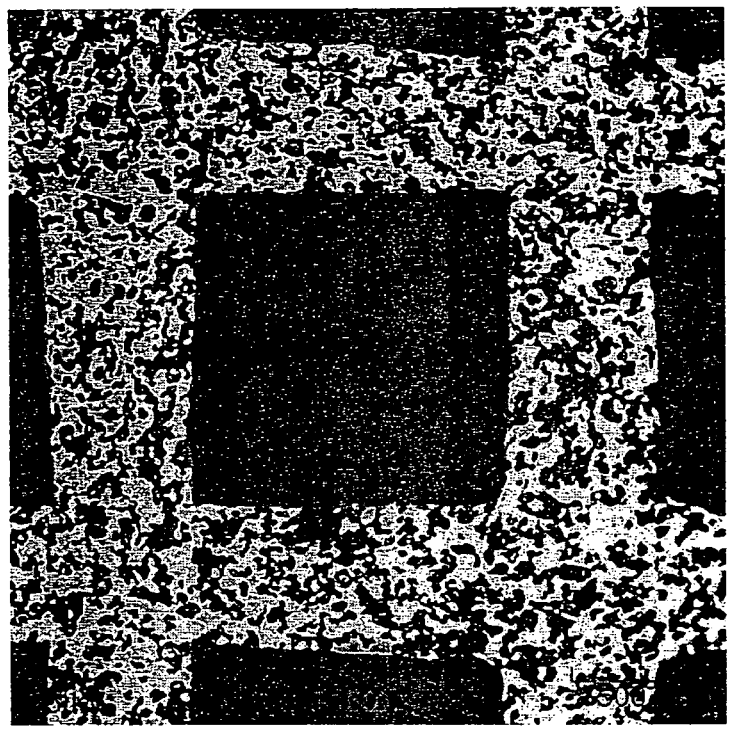
Figure 23:
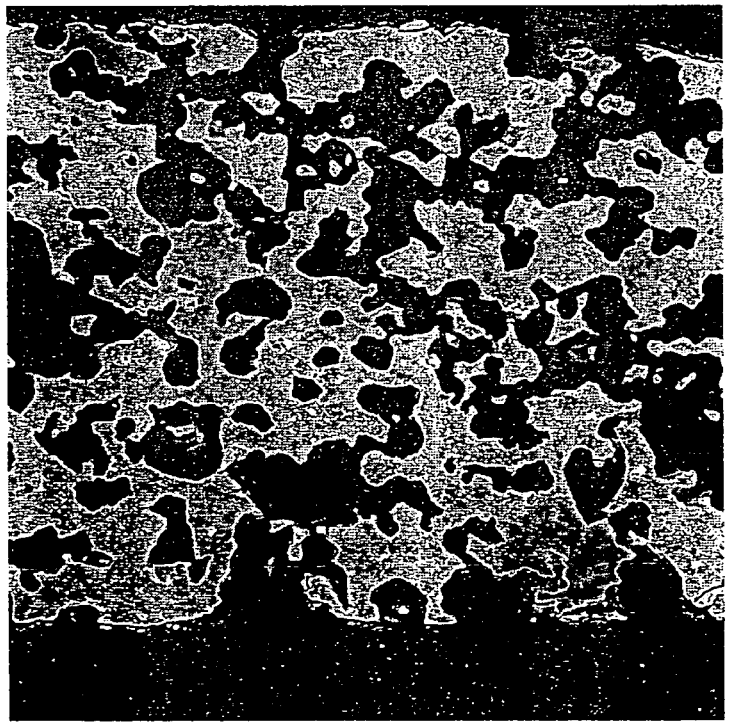

The porous ceramic honeycomb filter preferably exhibits a narrow pore size distribution; several examples of the pore size distribution being shown in FIGS. 11-19. In particular, FIGS. 11-13 relate to Example No. 1 including 13% sago palm starch, FIGS. 14-16 relate to Example No. 2 including 13% canna starch, and FIGS. 17-19 relate to Example No. 3 including 13% single-mode potato starch. FIGS. 11, 14 and 17, for example illustrate the pore diameter distribution thereby illustrating the percentage of the pore volume within each pore diameter range. For example, the tallest bar is positioned at between >16 µm and ≦18 µm and constitutes greater than 15% of the pore volume. In particular, greater than 55% of the pore volume exhibit pore diameters of >10 µm and ≦20 µm. FIG. 12 illustrates the cumulative % porosity in the range and that less than about 90% of the pore volume has a pore diameter of less than 28.5 µm. FIG. 13 illustrates the pore diameter for $d_1$, $d_{10}$, $d_{50}$ and $d_{90}$, for example, and is drawn to scale.

As was recognized by the inventors herein, achieving both relatively lower porosity and also narrow pore size distribution is a very difficult problem. However, according to certain exemplary embodiments of the invention, the narrow pore size distribution as exemplified by exhibiting $d_f \leq 0.3$ and, in addition, porosity is achieved, with $P \leq 55\%$. This combination of relatively lower porosity and narrow pore size distribution provides a filter with low back pressure, excellent heat capacity, and good filtration efficiency. These examples may also provide the combination of small amount of small pores ($d_1 \leq 8.0$ µm) and relatively lower porosity ($P \leq 55\%$). When achieved, this provides both low wash-coated pressure increase and improved thermal shock characteristics for the filter.

Additionally, the honeycomb filter of the present invention preferably exhibits, as shown in Table 3, a mean coefficient of thermal expansion (CTE) from 22° C. to 800° C., as measured by dilatometry, in the inventive cordierite article of less than $10.0 \times 10^{-7}/°$ C.; or even less than or equal to $7.0 \times 10^{-7}/°$ C., and in some embodiments, less than or equal to $5 \times 10^{-7}/°$ C. In certain embodiments, CTE of less than or equal to $4.0 \times 10^{-7}/°$ C., or even less than or equal to $3.0 \times 10^{-7}/°$ C. is achieved.

Figure 2:
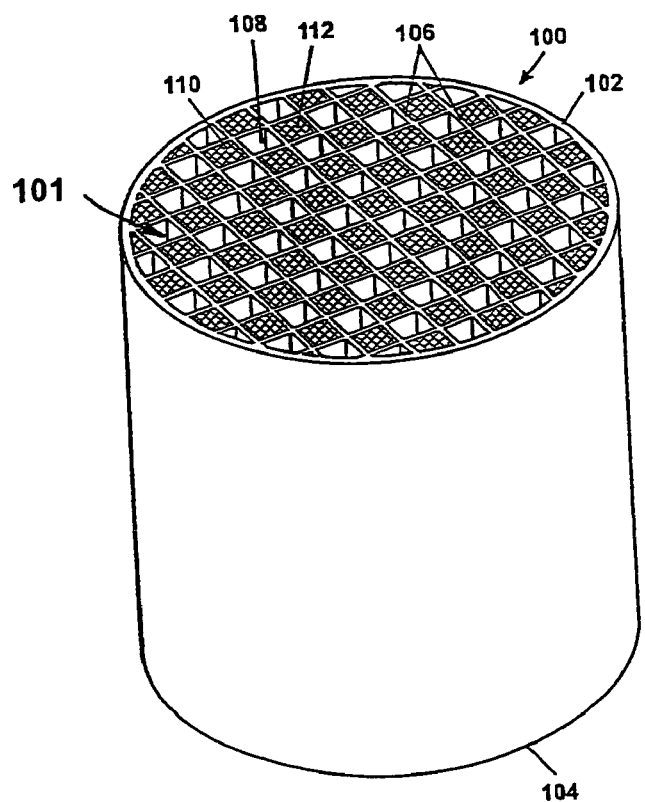
FIG. 2 illustrates a perspective view of a porous ceramic honeycomb filter according to further embodiments of the invention.

According to embodiments of the invention, the honeycomb article is configured as a porous ceramic honeycomb filter 100 as shown in FIG. 2 and includes a body of material in the form of a honeycomb structure 101. The material includes the controlled pore structure and is formed, preferably by extrusion, into a plurality of parallel cell channels (inlet cell channels 108 and outlet cell channels 110) separated by porous cell walls 106. At least some of the cell channels include preferably porous end plugs 112. Most preferably, a portion of the cell channels at the inlet end 102 are plugged with a paste having same or similar composition to that of the filter, for example as described in U.S. Pat. No. 4,329,162. The plugs 112 are preferably only located at the ends of the cell channels 108, 110 and typically have a depth of about 5 to 20 mm from the end, although this can vary. The plugs may be formed in a process as described in U.S. Pat. No. 4,557,773, for example. A portion of the inlet cell channels 108 are plugged on the outlet end 104, and a portion of the outlet channels 110 are plugged on the inlet end 102. The respective plugged inlet channels 108 are arranged adjacent to the plugged outlet channels 110 such that wall flow through the cell walls 106 is accomplished in use. Therefore, preferably each cell channel is plugged only at one end. The preferred arrangement is to have every other cell on a given face plugged as in a checkered pattern as shown in FIG. 2, although any other suitable plug arrangement may be employed.

This plugging configuration allows for more intimate contact between the exhaust stream and the porous wall of the substrate. The exhaust stream flows into the substrate through the open inlet cells 108 at the inlet end 102, then through the porous cell walls 106, and out of the structure through the open cells at the outlet end 104. Filters of the type herein described are known as "particulate" or "wall flow" filters since the flow paths resulting from alternate channel plugging require the exhaust being treated to flow through the porous ceramic cell walls prior to exiting the filter. Thus, such porous ceramic filters are useful for filtering particulate material from an exhaust, for example, removing/filtering soot from a diesel exhaust.

The inventive filters preferably have cellular densities from about 100 cells/in$^2$ (15.5 cells/cm$^2$) to about 400 cells/in$^2$ (62 cells/cm$^2$) and wall thicknesses (in between about 100 µm and 750 µm, more preferably between 100 µm and 500 µm.

For each example shown in Table 3, the total pore volume listed therein is measured by mercury porosimetry and is in units of cm$^3$/gm. The total pore volume comprised of pores of below a certain diameter is calculated from the mercury porosimetry data by computing the difference between the cumulative mercury intrusion at a particular micrometer measure, dividing by the total mercury intrusion, and multiplying the result by 100. Thus, for each example, the pore size distribution is provided. As can be readily recognized, the pore size distribution is narrow for all embodiments, and exceedingly narrow for some exemplary embodiments. This narrowness may be achieved, for example, by the selection and use of specific starches described below, or by otherwise manipulating the particle size distribution of the pore former. By utilizing these specific starches or pore formers having manipulated particle size distributions, diesel particulate filters having a low was coated pressure drop across the length of the filter and lower overall back pressure against the engine have been achieved than was possible with cordierite filters in the prior art.

According to further aspect, the invention is directed to a method for manufacturing a porous ceramic honeycomb article. The method comprises mixing a batch of inorganic raw materials with a pore former and forming aids. The pore former is preferably composed of a particular class of pore former. More particularly, the preferred pore former exhibits a narrow particle size distribution. "Pore former" as used herein is defined as a fugitive particulate material which evaporates or undergoes vaporization by combustion during drying or heating of the green body to obtain a desired, usually larger porosity and/or coarser median pore diameter than would be obtained otherwise without the pore former.

In a preferred embodiment, the pore former is included in the batch mixture for forming a porous ceramic honeycomb article and has a narrow particle size distribution given by the relationship:

$d_{ps} \leq 0.90$ wherein $d_{ps} = (dp_{90} - dp_{10})/dp_{50}$, and $dp_{10}$ is a particle size wherein 10% of the particle volume has a smaller particle size, $dp_{50}$ is a median particle size wherein 50% of the particle volume has a smaller particle size, and $dp_{90}$ is a particle size wherein 90% of the particle volume has a smaller particle size. Particle size is measured by a laser diffraction technique, such as a Microtrac particle size analyzer.

According to additional embodiments of the invention, the pore former used includes even a narrower particle size distribution characterized by $d_{ps} \leq 0.85$, or even $d_{ps} \leq 0.80$. Most preferably, the pore former is single-moded, and preferably a starch. The term "single-moded," as used herein, means the starch particle distribution data (the plot the differential of accumulate volume via. Logarithm of particles size), measured from the "microtrac" measurement when computer fit with a Gaussian function has a correlation function of 0.98 or above. When the starches described herein are utilized as the pore former agent, the starch preferably exhibits a median particle size, $dp_{50}$, of between 15 and 60 µm; and in some exemplary embodiments, between 20 and 50 µm.

The starch pore former preferably constitutes between 1-50 wt. %; more preferably between 5-30 wt. % of the inorganic raw materials. Preferred implementations include between 5-20 wt %; and more preferably yet between 5-15 wt. %. According to exemplary embodiments, the starch pore former utilized in the batch mixture is selected from a group consisting of canna starch, sago palm starch, green mung bean starch, and single-mode potato starch. Each of these starches is a single-moded starch. However, any starch or pore former having a narrow particle size distribution as described above may be substituted therefor. For cordierite batches, canna and single-mode starches are most preferred. For aluminum titanate batches, sago palm and green mung bean starches are most preferred. In particular, it should be recognized that the pore size distribution of the pore former may be manipulated to achieve the desired breadth as described herein. For example, the small sized particles may be sieved, sifted or otherwise separated out and removed from the distribution. Likewise, the large particle sizes in the distribution may be sieved, sifted or otherwise separated out and removed. Preferably, both are removed to provide the particle size breadth as described herein. In any case, the pore former is burned out during firing to form pores in the filter walls.

Figure 6:
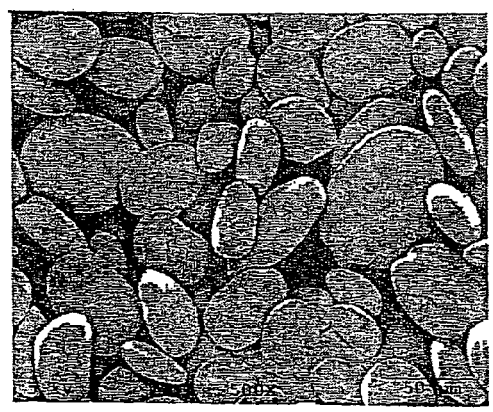
Figure 7:
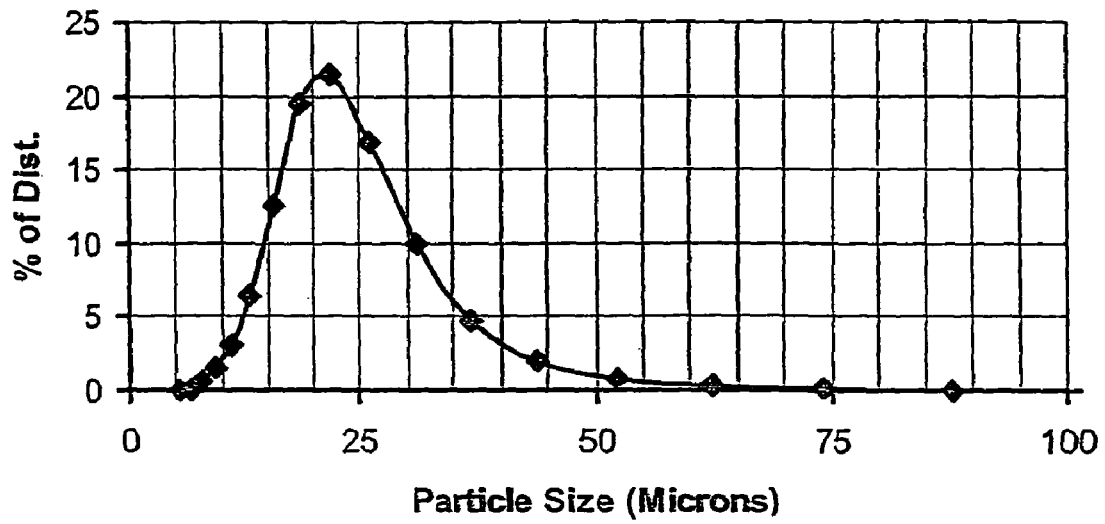
FIGS. 7-10 illustrate graphs of Particle Size vs. % of Distribution for the pore formers according to aspects of the invention.
Figure 8:
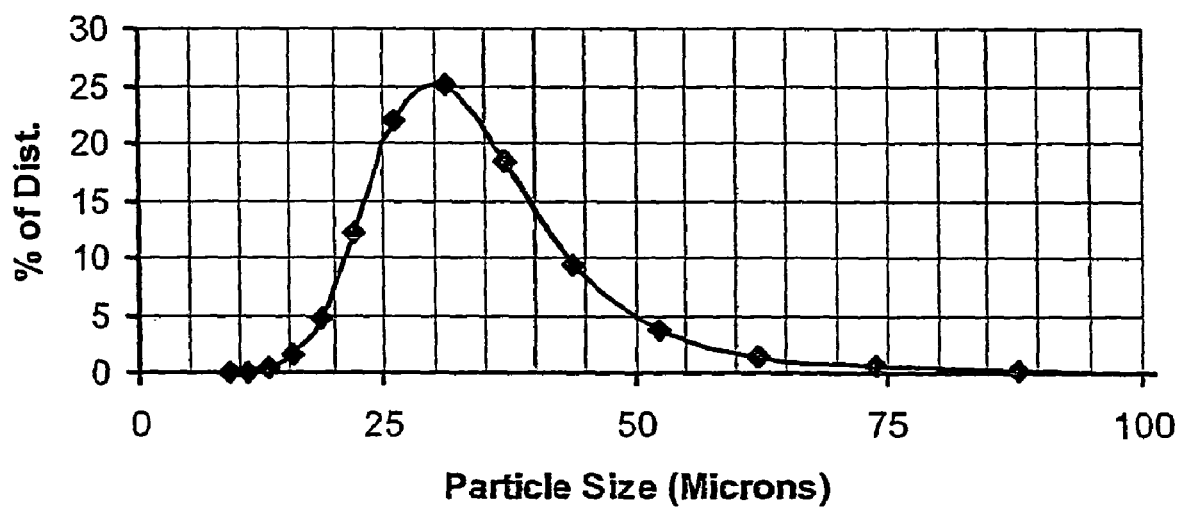
Figure 10:
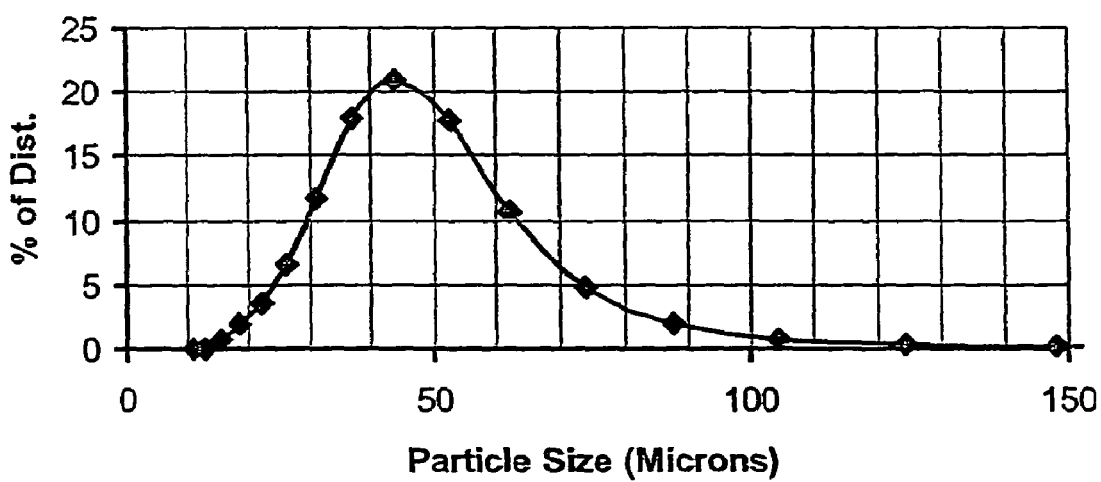

Canna starch exhibits a narrow pore size distribution, an example of which is shown in FIG. 10, and includes a mean particle size, $d_{p50}$, of between about 40-55 µm, and $d_{ps} \leq 0.90$. Canna (*Canna edulis* Ker-Gawler) is a starchy root crop that is generally grown in tropical highlands, such as the Andean range, as well as in other parts of the developing world such as Vietnam, southern China, Taiwan, and Indonesia. Canna starch has large grains (see FIG. 6) that settle quickly out of a suspension of grated tuber tissue. The starch is high in amylose and functionally similar to mung bean starch, the traditional raw material for transparent noodles. Canna starch is very inexpensive to produce and is an outstandingly versatile and robust crop.

Figure 4:
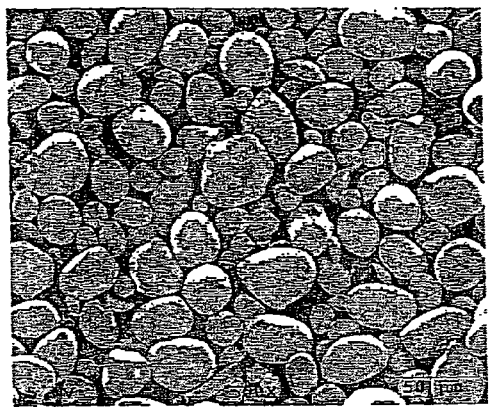

Sago palm starch also exhibits a narrow pore size distribution, an example of which is shown in FIG. 4, and includes a mean particle size, $d_{p50}$, of between about 25-35 µm, and $d_{ps} \leq 0.8$. Sago palm starch is prepared from the pith of several genera of palms, *Metroxylon, Borassus*, and *Arenga*, and from cycads of the genus *Cycas*, native to the East Indies. Sago palm starch takes on the form of small whitish, pinkish, or brownish grains (see FIG. 4).

Figure 3:
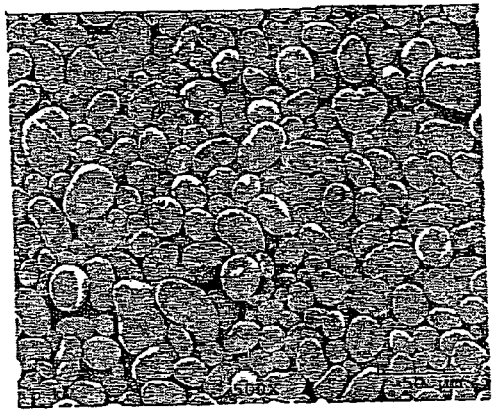
FIGS. 3-6 show micrographs of the relative size and shape of various starch pore formers according to further aspects of the invention.

Green mung bean starch also exhibits a narrow pore size distribution, an example of which is shown in FIG. 3, and includes a mean particle size, $d_{p50}$, of between about 15-30 µm, and $d_{ps} \leq 88$. Green mung bean starch is sometimes referred to as mung bean flour or green pea flour, both of which are misnomers for the fine white starch of the green mung bean. Grown in many parts of Asia, the tiny bean with olive green skin (*Phaseolus aureus, Vigna radiata*) is also sometimes referred to as green pea. The starch is available in its natural (white) state or tinted pink or green, the color only showing when water is added. In China, the green mung bean is referred to as "lue dau fen."

Figure 5:
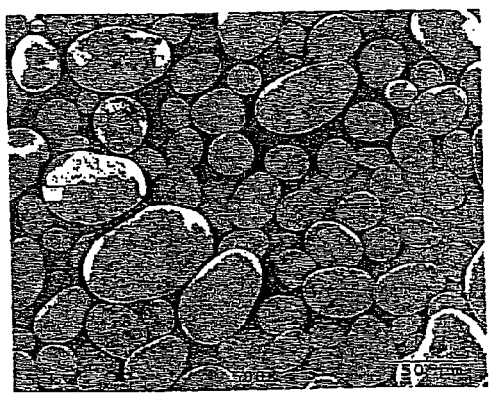
Figure 9:
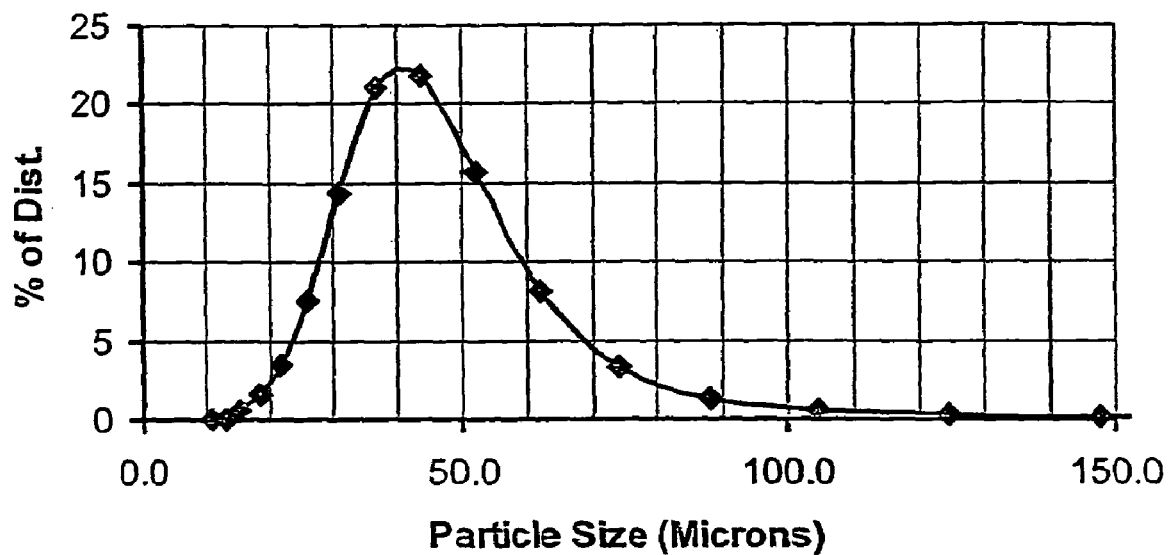

Single-mode potato starch also exhibits a narrow pore size distribution, an example of which is shown in FIG. 9, and includes a mean particle size, $d_{p50}$, of between about 30-60 µm, and $d_{ps} \leq 0.88$. Single-mode potato starch is a product of a potato grown in Japan in the northern island of Hokkaido. Single-mode potato starch takes on the form of small whitish, pinkish, or brownish grains (see FIG. 5). Single-mode potato starch is available under the tradename Shirakiku, for example.

According to another broad aspect, the invention is a batch mixture used for forming the ceramic honeycomb article. The batch comprises a mixture of sources of inorganic materials, and a pore former selected from a group consisting of canna starch, sago palm starch, green mung bean starch, and single-mode potato starch, as described above. The inorganic source materials include at least two selected from a group of forming sources consisting of magnesia, alumina, silica, and titania. In the case of cordierite-forming batch mixtures, the inorganic source materials include magnesia-, alumina-, and silica-forming sources. Most preferably, the source materials are as described below.

The batch preferably also includes forming aids that may include a plasticizer, lubricant, binder, and solvent vehicle. Methocel is the preferred binder. Water is the preferred solvent vehicle. The inorganic raw materials are blended together with organic forming aids (and the solvent vehicle) to form a homogeneous plastic batch mixture. The plastic batch mixture is then preferably formed into a honeycomb green body, optionally dried, and then fired in a furnace to form the final porous honeycomb article. The forming is preferably accomplished by an extrusion process by extruding the plastic mixture from a twin screw or ram extruder through an extrusion die, as taught in U.S. Pat. No. 6,080,348, for example. The extruded honeycomb green body 10 has a honeycomb structure as shown in FIG. 1. The honeycomb green body article 10 includes the pore former with narrow pore size distribution as described above, i.e., with $d_{ps} \leq 0.9$. The preferred pore former is a starch; most preferably a single-moded starch as described above.

The raw inorganic source materials preferably include one or more talc sources, one or more alumina-forming sources, and one or more silica-forming sources. Preferably, the raw material mixture also contains kaolin clay.

In a preferred embodiment, the cordierite-forming inorganic source materials include talc, kaolin clay, a silica source such as quartz, and multiple alumina sources. The median particle sizes of the inorganic raw materials, as described below, are measured in micrometers, and are derived from the volumetric distribution of particle sizes, as measured by a laser diffraction technique.

The preferred talc, a magnesium silicate source, has a mean particle size greater than about 15 µm, and preferably greater than about 20 µm, but preferably has a mean particle size less than 35 micrometers. The talc source may also include a calcined talc. The talc is preferably provided in a amount of between 35 and 45 wt. % of the total inorganic materials.

Additionally, the mixture preferably contains a clay, an aluminum silicate source, such as kaolin clay. If present, the weight percentage of kaolin should be in the range of between 12 and 20 wt. %. Weight percents of kaolin greater than this value will result in higher pressure drops for the filter.

The silica-forming source includes, but is not limited to, quartz, cristobalite, non-crystalline silica such as fused silica or a sol-gel silica, zeolite, and diatomaceous silica, and combinations thereof. Quartz is most preferred. The average of the median particle sizes of the silica source is preferably greater than 10 µm, and is preferably between 10 and 35 µm.

The alumina-forming source is preferably a powder which, when heated to a sufficiently high temperature in the absence of other raw materials, yields substantially pure aluminum oxide. The alumina-forming source may be an alpha-alumina, a transition alumina such a gamma-alumina or rho-alumina, boehmite, aluminum hydroxide (aluminum trihydrate), or mixtures thereof. Most preferably, the alumina-forming source comprises a combination of α-alumina ($Al_2O_3$) and aluminum trihydrate. Preferably, the weighted average of the median particle sizes of the alumina-forming sources have a median particle size of less than 10 µm; more preferably less than 5 µm.

One additional advantage of the present invention is the elimination of the pore-forming agent graphite from the raw material mixture. Graphite, when included in the green body, may be detrimental to the drying process, in that arcing may occur during drying. Additionally, graphite may produce large exothermic reactions during firing that may require longer firing cycle times or which may contribute to cracking of honeycomb articles. Use of the starch pore formers in accordance with embodiments of the present invention eliminates the need for graphite. Additionally, sufficient levels of porosity (greater than 40%) can be readily achieved with a lower weight percentage of pore former. This also has the propensity to reduce cracking during firing. Moreover, relatively high levels of porosity may be achieved with much less pore former. Alternatively, shorter firing cycles may be achieved. To more fully illustrate the invention, the following non-limiting examples are presented. All parts, portions and percentages are on a weight basis unless otherwise stated.

EXAMPLES

As shown in FIG. 1, inventive examples of cordierite green bodies 10 were prepared by weighing out the dry ingredients including various examples of the inventive pore formers listed in Table 2 and forming aids such as a cellulosic material, for example methyl cellulose, and sodium stearate. The dry ingredients are then mixed with a solvent vehicle, such as with water, and kneaded in a preferably stainless steel muller to form an extrudable plastic mass. The plastic mass is then formed, preferably extruded, into a green body, as described in U.S. Pat. No. 5,205,991, for example. Upon being extruded, the cellular honeycomb green bodies are cut to a log length.

The extruded green body 10 includes a honeycomb structure having a plurality of generally parallel cell channels 11 formed, at least partially defined by intersecting cell walls 14 (otherwise referred to as "webs") that extend from a first end 12 to a second end 13. Preferably, the green body 10 also includes an extruded smooth skin 15 formed about the honeycomb structure, although this is optional and may be formed in later processing. The wall thickness of each cell wall 14 is preferably about 0.01 to 0.03 inches (about 254 to 762 µm). All examples manufactured herein were 0.021 inch (533 µm). In a preferred implementation, the cellular honeycomb structure consists of multiplicity of parallel cell channels 11 of generally square cross section formed into a honeycomb structure. Alternatively, other cross-sectional configurations may be used in the honeycomb structure as well, including rectangular, round, oblong, triangular, octagonal, hexagonal, or combinations thereof. The term "honeycomb structure" as used herein is defined as a connected structure of longitudinally-extending cells formed of thin cell walls, having a generally repeating pattern therein.

The green body is preferably dried using a conventional microwave or RF drier as is known to those persons of ordinary skill in the art. After drying, the parts are fired in a furnace at an average heating rate of between 1 and 100° C./hour, more preferably between 20 and 70° C./hour, and most preferably between 25 and 50° C./hour, to a maximum (top) temperature of 1400° C. to 1440° C., more preferably 1410° C. to 1440° C., and more preferably yet between 1410° C. to 1435° C. and held at this top temperature for 1 to 30 hours, more preferably 5 to 25 hours, and most preferably 10 to 20 hours. Following firing, at least some of the cell channels are plugged, for example, as is described in U.S. Pat. No. 4,557,773 to Bonzo. Preferably, the plugs are provided in a checkerboard pattern on each respective end; wherein inlet channels are plugged at the second end and outlet channels are plugged at the first end. The plugged filter may then be re-fired.

The inventors herein discovered that by utilizing the pore formers listed herein, the pore size distribution of the present invention porous ceramic honeycomb filter may be desirably manipulated and made to be relatively narrow. In particular, by the selection and use of the pore formers and raw materials described herein, cordierite honeycomb articles, such as porous ceramic honeycomb filters, exhibiting a narrow pore size distribution may be manufactured. The narrowness of the distribution is best characterized by having a pore size breadth, $d_b$, which is relatively narrow; the narrowness being characterized by having $d_b \leq 1.00$, wherein, $d_b$ is defined by the relation:

$$d_b = (d_{90} - d_{10})/d_{50}$$

wherein $d_{10}$ is a pore diameter wherein 10% of the pore volume has a smaller pore diameter, $d_{50}$ is a median pore diameter wherein 50% of the pore volume has a smaller pore diameter, and $d_{90}$ is a pore diameter wherein 90% of the pore volume has a smaller pore diameter.

Providing such narrow pore size distribution provides relatively lower clean pressure drop in such porous ceramic filters, as well as excellent filtration efficiency. Certain exemplary cordierite-containing embodiments exhibit $d_b \leq 0.90$ (Ex. 2-6, 14). Other cordierite-containing embodiments exhibit exceedingly low $d_b$, such as where $d_b \leq 0.85$ (Ex. 3-5), or even $d_b \leq 0.75$ (Ex. 4). Additionally, such narrow pore size may be achieved while also providing low coefficient of thermal expansion (between 25-800° C.) of less than $10.0 \times 10^{-7}/°$ C. In some embodiments, coefficient of thermal expansion (25-800° C.) of less than or equal to $7.0 \times 10^{-7}/°$ C., or even $5.0 \times 10^{-7}/°$ C. or less are provided. Certain exemplary embodiments exhibit CTE of less than or equal to $4.0 \times 10^{-7}/°$ C., or even less than or equal to $3.0 \times 10^{-7}/°$ C. Advantageously, excellent thermal shock resistance is provided.

Additionally, such ceramic filter articles may be made to also have few small pores in addition to a relatively narrow pore size distribution. In particular, the lack of small pores in such porous ceramic filter articles is characterized in that $d_1$ is made small. Most preferably, such porous ceramic filters are characterized by pore size distributions which exhibit the relation:

$$d_1 \geq 7.0 \text{ µm}$$

wherein $d_1$ is a pore diameter wherein 1% of a total pore volume of the pore size distribution has a smaller diameter.

Such porous ceramic filter articles produced, when coated with a wash coat, exhibit low wash-coated pressure increase, as well as low overall back pressure and good filtration efficiency. Additionally, several embodiments of the invention exhibit the combination of both low porosity as characterized by porosity, P, wherein P≦55%, small amounts of small pores are characterized by $d_1 \geq 7.0$ μm, and narrow pore size distribution as characterized by having $d_b \leq 1.00$. Such filters have excellent heat capacity, low back overall clean pressure drop and low wash-coated pressure increase and good filtration efficiency.

More particularly, the inventors herein discovered according to further embodiments of the invention that the use of certain amounts of the specific starches described herein (e.g., canna, sago, green mung bean, and single-mode potato) may be used to produce the above-described relatively narrow pore size distributions in porous ceramic cordierite filters. These starches exhibit very narrow particle distributions (as characterized by low Dfp and/or low Dps, see Table 1 below) and, thus, contribute to the relative narrowness of the cordierite ceramic material's pore size distribution.

The narrowness of the particle size distribution for these starches is described and illustrated in Table 1 and in FIGS. 3-6. FIGS. 3-6 provide information about the particle size distributions of the preferred starch materials according to embodiments of the present invention. In particular, the raw material particle sizes given below are measured by a laser diffraction technique. In particular, they are measured by a Microtrac FRA9200 Series particle size analyzer.

TABLE 1

Pore Former Examples

| Type of Starch | $dp_{10}$ (μm) | $dp_{50}$ (μm) | $dp_{90}$ (μm) | Dfp = (d50 − d10)/d50 | Dps = (d90 − d10)/d50 |
|---|---|---|---|---|---|
| Single-mode Potato Starch | 30.6 | 44.7 | 68.2 | 0.32 | 0.84 |
| *Canna* Starch | 31.3 | 47.7 | 73.3 | 0.34 | 0.88 |
| Sago Palm Starch | 23.5 | 32.6 | 47.8 | 0.28 | 0.74 |
| Green Mung Bean Starch | 15.8 | 23.6 | 36.9 | 0.33 | 0.84 |

TABLE 2

Example Cordierite Compositions

| | Example No. | | | | |
|---|---|---|---|---|---|
| | 1 | 2 | 3 | 4 | 5 |
| Starch Type | Sago | *Canna* | Single-Mode Potato | Sago | Single-Mode Potato |
| Wt. % Starch (%) | 13 | 13 | 13 | 13 | 13 |
| Max. Firing Temp (° C.) | 1425 | 1425 | 1425 | 1435 | 1435 |
| Inorganic Raw Materials | | | | | |
| Talc | 40.70 | 40.70 | 40.70 | 40.70 | 40.70 |
| Average of Median Particle Sizes of Talc Sources (μm) | 24 | 24 | 24 | 24 | 24 |
| Kaolin | 16.00 | 16.00 | 16.00 | 16.00 | 16.00 |
| α-Al$_2$O$_3$ A | 14.80 | 14.80 | 14.80 | 14.80 | 14.80 |
| Al(OH)$_3$ A | 16.00 | 16.00 | 16.00 | 16.00 | 16.00 |
| Average Median Particle Size of Alumina-Forming Sources (μm) | 3.5 | 3.5 | 3.5 | 3.5 | 3.5 |
| Quartz | 12.5 | 12.5 | 12.5 | 12.5 | 12.5 |
| Average Median Particle Size of Silica Sources (μm) | 27 | 27 | 27 | 27 | 27 |
| Organic Materials | | | | | |
| Methyl Cellulose | 4.0 | 4.0 | 4.0 | 4.0 | 4.0 |
| Sodium Stearate | 1.0 | 1.0 | 1.0 | 1.0 | 1.0 |

| | Example No. | | | | |
|---|---|---|---|---|---|
| | 6 | 7 | 8 | 9 | 10 |
| Starch Type | *Canna* | *Canna* | Single-Mode Potato | Single-mode Potato | Single-mode Potato |
| Wt. % Starch (%) | 10 | 7 | 12 | 5 | 20 |
| Max. Firing Temp (° C.) | 1425 | 1425 | 1435 | 1435 | 1435 |
| Inorganic Raw Materials | | | | | |
| Talc | 40.70 | 40.70 | 40.7 | 40.70 | 40.70 |
| Average of Median Particle Sizes of Talc Sources (μm) | 24 | 24 | 24 | 24 | 24 |
| Kaolin | 16.00 | 16.00 | 16.00 | 16.00 | 16.00 |
| α-Al$_2$O$_3$ A | 14.80 | 14.80 | | 14.80 | 14.80 |
| α-Al$_2$O$_3$ B | | | 14.80 | | |
| Al(OH)$_3$ A | 16.00 | 16.00 | | 16.00 | 16.00 |
| Al(OH)$_3$ B | | | 16.00 | | |
| Average Median Particle Size of Alumina-Forming Sources (μm) | 3.5 | 3.5 | 9.5 | 3.5 | 3.5 |
| Quartz | 12.5 | 12.5 | 12.5 | 12.5 | 12.5 |
| Average Median Particle Size of Silica Sources (μm) | 27 | 27 | 27 | 27 | 27 |

TABLE 2-continued

Example Cordierite Compositions

Organic Materials

| | | | | | |
|---|---|---|---|---|---|
| Methyl Cellulose | 4.0 | 4.0 | 4.0 | 4.0 | 4.0 |
| Sodium Stearate | 1.0 | 1.0 | 1.0 | 1.0 | 1.0 |

| | Example No. | | | |
|---|---|---|---|---|
| | 11 | 12 | 13 | 14 |
| Starch type | Green Mung Bean | Sago | Canna | Canna |
| Wt. % Starch (%) | 10 | 12 | 12 | 10 |
| Max. Firing Temp (° C.) | 1435 | 1425 | 1425 | 1435 |
| Inorganic Raw Materials | | | | |
| Talc | 40.7 | 40.7 | 40.7 | 40.7 |
| Average Median Particle Size of Talc Sources (μm) | 24 | 24 | 24 | 24 |
| Kaolin | 16.0 | 16.0 | 16.0 | 16.0 |
| α-$Al_2O_3$ B | 14.8 | 14.8 | 14.8 | 14.8 |
| $Al(OH)_3$ B | 16.0 | 16.0 | 16.0 | 16.0 |
| Average Median Particle Size of Alumina-Forming Sources (μm) | 9.5 | 9.5 | 9.5 | 9.5 |
| Quartz | 12.5 | 12.5 | 12.5 | 12.5 |
| Average Median Particle Size of Silica Sources (μm) | 27 | 27 | 27 | 27 |
| Organic Materials | | | | |
| Methyl Cellulose | 4.0 | 4.0 | 4.0 | 4.0 |
| Sodium Stearate | 1.0 | 1.0 | 1.0 | 1.0 |

TABLE 3

Cordierite Examples - Properties

| | Example No. | | | | |
|---|---|---|---|---|---|
| | 1 | 2 | 3 | 4 | 5 |
| Starch Type | Sago | Canna | Single-Mode Potato | Canna | Single-Mode Potato |
| Wt. % Starch | 13% | 13% | 13% | 13% | 13% |
| Soak Temp (° C.) | 1425 | 1425 | 1425 | 1435 | 1435 |
| Soak Time (hours) | 15 | 15 | 15 | 15 | 15 |
| Fired Properties | | | | | |
| CTE ($10^{-7}$/° C.) 22-800° C. | 6.2 | 5.5 | 5.9 | 4.8 | 5.6 |
| Predominant Phase | Cordierite | Cordierite | Cordierite | Cordierite | Cordierite |
| Cell Density (cells/$in^2$) | 200 | 200 | 200 | 200 | 200 |
| Wall Thickness (inches) | 0.021 | 0.021 | 0.021 | 0.021 | 0.021 |
| MOR (psi) | 562 | 552 | 606 | — | — |
| Porosity (%) | 56 | 56 | 56 | 51 | 56 |
| $d_1$ (μm) | 7.4 | 7.8 | 8.1 | 9.3 | 9.4 |
| $d_{10}$ (μm) | 11.5 | 12.2 | 12.4 | 17.4 | 15.4 |
| $d_{50}$ (μm) | 17.6 | 18.0 | 18.6 | 23.1 | 21.1 |
| $d_{90}$ (μm) | 28.5 | 27.8 | 28.2 | 33.7 | 32.2 |
| $d_f = (d_{50} - d_{10})/d_{50}$ | 0.35 | 0.32 | 0.33 | 0.25 | 0.27 |
| $d_b = (d_{90} - d_{10})/d_{50}$ | 0.97 | 0.87 | 0.84 | 0.70 | 0.80 |
| Distribution Data | | | | | |
| Total Intrusion Volume ($cm^3/g$) | 0.5138 | 0.5338 | 0.5129 | 0.4148 | 0.5062 |
| Intrusion Volume at indicated pore diameter ($cm^3/g$) | | | | | |
| 1 μm | 0.5135 | 0.5331 | 0.5129 | 0.4140 | 0.5057 |
| 2 μm | 0.5134 | 0.5330 | 0.5129 | 0.4134 | 0.5056 |
| 4 μm | 0.5127 | 0.5329 | 0.5129 | 0.4117 | 0.5048 |
| 10 μm | 0.4869 | 0.5124 | 0.4938 | 0.4081 | 0.5004 |
| 20 μm | 0.1729 | 0.1754 | 0.1968 | 0.3196 | 0.3032 |
| 30 μm | 0.0411 | 0.0434 | 0.0409 | 0.0551 | 0.0511 |
| 40 μm | 0.0274 | 0.0309 | 0.0271 | 0.0296 | 0.0292 |

TABLE 3-continued

Cordierite Examples - Properties

| | | | | | |
|---|---|---|---|---|---|
| 50 μm | 0.0221 | 0.0265 | 0.0221 | 0.0230 | 0.0212 |
| 60 μm | 0.0170 | 0.0211 | 0.0171 | 0.0185 | 0.0178 |
| 70 μm | 0.0147 | 0.0187 | 0.0149 | 0.0151 | 0.0152 |
| 80 μm | 0.0124 | 0.0163 | 0.0124 | 0.0130 | 0.0130 |
| 90 μm | 0.0110 | 0.0148 | 0.0110 | 0.0112 | 0.0092 |
| 100 μm | 0.0096 | 0.0134 | 0.0097 | 0.0098 | 0.0084 |

| | Example No. | | | | |
|---|---|---|---|---|---|
| | 6 | 7 | 8 | 9 | 10 |
| Starch Type | *Canna* | *Canna* | Single-mode Potato | Single-mode Potato | Single-mode Potato |
| Starch Wt. % (%) | 10 | 7 | 12 | 5 | 20 |
| Soak Temp (° C.) | 1435 | 1425 | 1435 | 1435 | 1435 |
| Soak Time (hours) | 15 | 15 | 15 | 15 | 15 |
| Fired Properties | | | | | |
| CTE ($10^{-7}$/° C.) 22-800° C. | 3.5 | 4.0 | 5.6 | 3.3 | 5.0 |
| Predominant Phase | Cordierite | Cordierite | Cordierite | Cordierite | Cordierite |
| Cell Density (cells/in$^2$) | 200 | 200 | 200 | 200 | 200 |
| Wall Thickness (inches) | 0.013 | 0.013 | 0.013 | 0.013 | 0.013 |
| MOR (psi) | — | — | — | — | — |
| Porosity (%) | 46 | 45 | 62 | 42 | 59 |
| $d_1$ (μm) | 7.4 | 2.8 | 10.7 | 8.1 | 10.8 |
| $d_{10}$ (μm) | 13.2 | 8.8 | 17.8 | 11.5 | 15.6 |
| $d_{50}$ (μm) | 17.9 | 14.0 | 30.0 | 17.1 | 21.3 |
| $d_{90}$ (μm) | 29.0 | 24.4 | 60.0 | 33.2 | 37.2 |
| $d_f = (d_{50} - d_{10})/d_{50}$ | 0.26 | 0.37 | 0.41 | 0.33 | 0.27 |
| $d_b = (d_{90} - d_{10})/d_{50}$ | 0.88 | 1.18 | 1.40 | 1.27 | 1.02 |
| Distribution Data | | | | | |
| Total Intrusion Volume (cm$^3$/g) | 0.3565 | 0.3367 | 0.6807 | 0.3111 | 0.5916 |
| Intrusion Volume at indicated pore diameter (cm$^3$/g) | | | | | |
| 1 μm | 0.3553 | 0.3343 | 0.6807 | 0.3111 | 0.5916 |
| 2 μm | 0.3549 | 0.3341 | 0.6807 | 0.3111 | 0.5916 |
| 4 μm | 0.3547 | 0.3329 | 0.6807 | 0.3111 | 0.5916 |
| 10 μm | 0.3488 | 0.2816 | 0.6752 | 0.2975 | 0.5880 |
| 20 μm | 0.1158 | 0.0494 | 0.5740 | 0.0959 | 0.3584 |
| 30 μm | 0.0322 | 0.0246 | 0.3388 | 0.0367 | 0.0786 |
| 40 μm | 0.0188 | 0.0172 | 0.1840 | 0.0228 | 0.0496 |
| 50 μm | 0.0146 | 0.0141 | 0.1105 | 0.0177 | 0.0381 |
| 60 μm | 0.0105 | 0.0110 | 0.0668 | 0.0136 | 0.0271 |
| 70 μm | 0.0880 | 0.0096 | 0.0423 | 0.0118 | 0.0231 |
| 80 μm | 0.0071 | 0.0082 | 0.0304 | 0.0101 | 0.0191 |
| 90 μm | 0.0062 | 0.0074 | 0.0256 | 0.0092 | 0.0169 |
| 100 μm | 0.0053 | 0.0065 | 0.0202 | 0.0082 | 0.0147 |

| | Example No. | | | |
|---|---|---|---|---|
| | 11 | 12 | 13 | 14 |
| Starch Type | Green Mung Bean | Sago | *Canna* | *Canna* |
| Starch Wt. % (%) | 10 | 12 | 12 | 10 |
| Soak Temp (° C.) | 1435 | 1425 | 1425 | 1435 |
| Soak Time (hours) | 15 | 15 | 15 | 15 |
| Fired Properties | | | | |
| CTE ($10^{-7}$/° C.) 22-800° C. | 6.5 | 4.7 | 4.8 | 5.1 |
| Predominant Phase | Cordierite | Cordierite | Cordierite | Cordierite |
| Cell Density (cells/in$^2$) | 208 | 262 | 262 | 208 |
| Wall Thickness (inches) | 0.0136 | 0.0142 | 0.0145 | 0.0136 |
| MOR (psi) | — | 413 | 407 | — |
| Porosity (%) | 50 | 51 | 52 | 51 |
| $d_1$ (μm) | 8.7 | 9.0 | 9.1 | 12.4 |
| $d_{10}$ (μm) | 13.5 | 13.0 | 14.0 | 18.5 |
| $d_{50}$ (μm) | 20.2 | 19.0 | 20.7 | 25.0 |
| $d_{90}$ (μm) | 40.1 | 34.3 | 36.6 | 40.0 |
| $d_f = (d_{50} - d_{10})/d_{50}$ | 0.33 | 0.32 | 0.32 | 0.26 |
| $d_b = (d_{90} - d_{10})/d_{50}$ | 1.31 | 1.12 | 1.09 | 0.86 |

TABLE 3-continued

Cordierite Examples - Properties

Distribution Data

| Total Intrusion Volume (cm³/g) | 0.4091 | 0.4225 | 0.4359 | 0.3940 |
|---|---|---|---|---|
| Intrusion Volume at indicated pore diameter (cm³/g) | | | | |
| 1 μm | 0.4085 | 0.4225 | 0.4351 | 0.3940 |
| 2 μm | 0.4083 | 0.4225 | 0.4351 | 0.3938 |
| 4 μm | 0.4077 | 0.4224 | 0.4351 | 0.3930 |
| 10 μm | 0.4022 | 0.4141 | 0.4281 | 0.3901 |
| 20 μm | 0.2105 | 0.1538 | 0.2415 | 0.3204 |
| 30 μm | 0.0871 | 0.0546 | 0.0617 | 0.0998 |
| 40 μm | 0.0403 | 0.0331 | 0.0336 | 0.0491 |
| 50 μm | 0.0302 | 0.0239 | 0.0285 | 0.0287 |
| 60 μm | 0.0201 | 0.0184 | 0.0185 | 0.0229 |
| 70 μm | 0.0163 | 0.0160 | 0.0154 | 0.0190 |
| 80 μm | 0.0124 | 0.0127 | 0.0123 | 0.0151 |
| 90 μm | 0.0106 | 0.0107 | 0.0107 | 0.0131 |
| 100 μm | 0.0089 | 0.0095 | 0.0091 | 0.0111 |

TABLE 4

Example Aluminum Titanate Composition

| | Example No. 15 |
|---|---|
| Starch Type | Sago |
| Starch Wt. % (%) | 16 |
| Inorganic Raw Materials | |
| Titania (Ti-Pure) | 29.95 |
| $Al_2O_3$ (Alcoa A10 - 325) | 46.57 |
| $Al(OH)_3$ AC 714 | 3.71 |
| Silica | 10.19 |
| $SrCO3$ | 8.00 |
| $CaCO_3$ | 1.38 |
| $La_2O_3$ | 0.20 |
| Organic Materials | |
| Methylcellulose Binder | 4.5 |
| Emulsia "T" | 9.0 |

TABLE 5

Aluminum Titanate Example - Properties

| | Example No. 15 |
|---|---|
| Starch Type | Sago |
| Starch Wt. % (%) | 16 |
| Soak Temp (° C.) | 1450 |
| Soak Time (hours) | 15 |
| Fired Properties | |
| CTE ($10^{-7}$/° C.) 22-800° C. | 5.8 |
| Predominant Phase | Aluminum Titanate |
| Cell Density (cells/in²) | 300 |
| Wall Thickness (inches) | 0.013 |
| MOR (psi)/type | 238 |
| Porosity (%) | 51 |
| $d_1$ (μm) | 7.3 |
| $d_{10}$ (μm) | 12.9 |
| $d_{50}$ (μm) | 16.5 |
| $d_{90}$ (μm) | 25.2 |
| $d_f = (d_{50} - d_{10})/d_{50}$ | 0.219 |
| $d_b = (d_{90} - d_{10})/d_{50}$ | 0.748 |

TABLE 5-continued

Aluminum Titanate Example - Properties

| | Example No. 15 |
|---|---|
| Distribution Data | |
| Total Intrusion Volume (cm³/g) | 0.2802 |
| Intrusion Volume at indicated pore diameter (cm³/g) | |
| 1 μm | 0.2799 |
| 2 μm | 0.2799 |
| 4 μm | 0.2799 |
| 10 μm | 0.2684 |
| 20 μm | 0.0504 |
| 30 μm | 0.0241 |
| 40 μm | 0.0174 |
| 50 μm | 0.0159 |
| 60 μm | 0.0123 |
| 70 μm | 0.0102 |
| 80 μm | 0.0091 |
| 90 μm | 0.0080 |
| 100 μm | 0.0071 |

Tables 4 and 5 above illustrate an example of the present invention wherein the oxide-based material forming the walls of the filter is an aluminum titanate material. As can be seen, $d_1 \geq 7.0$ μm for this example. Further, a narrow pore size distribution was achieved by utilizing sago starch as the pore former. The porosity may be controlled by controlling its amount between 1 and 50 wt. %; more preferably between 5 and 30 wt. %; more preferably yet between 10 and 20%. Additionally, the example filter article containing aluminum titanate includes a narrow small-sized portion of the distribution characterized by $d_f \leq 0.25$; more preferably $d_f \leq 0.23$; or even $d_f \leq 0.22$. Furthermore, the filter article includes narrow overall pore size distribution, as exemplified by $d_b \leq 0.9$; more preferably $d_b \leq 0.8$; or even $d_b \leq 0.75$. Additionally, the filter article containing aluminum titanate includes controlled porosity, P, wherein P % $\leq$ 55%. Preferably also, the article includes $d_{90} < 30$ μm. Additionally, $d_{50}$ is preferably between 10 and 20 μm for filters containing aluminum titanate material. CTE for the article containing aluminum titanate is less than $15 \times 10^{-7}$/° C.; preferably less than $10 \times 10^{-7}$/° C., or even less than $6 \times 10^{-7}$/° C., all as measured between room temperature and 1000° C.

It should be understood that while the present invention has been described in detail with respect to certain illustrative and specific embodiments thereof, it should not be considered limited to such and may be used in other ways without departing from the scope of the invention as defined in the appended claims.

What is claimed is:

1. A porous ceramic honeycomb filter comprising:
an oxide-based ceramic material having many pores with a pore size distribution wherein no more than 1.0% of a total pore volume of the pore size distribution has a pore diameter of less than or equal to 7.0 microns.

2. The porous ceramic honeycomb filter of claim 1 oxide-based ceramic material is selected from a group consisting of cordierite and aluminum titanate.

3. The porous ceramic honeycomb filter of claim 2 wherein the filter comprises a diesel particulate filter.

4. The porous ceramic honeycomb filter of claim 2 wherein no more than 1.0% of the total pore volume of the pore size distribution has a pore diameter of less than or equal to 8.0 microns.

5. The porous ceramic honeycomb filter of claim 2 wherein no more than 1.0% of a total pore volume of the pore size distribution has a pore diameter of less than or equal to 9.0 microns.

6. The porous ceramic honeycomb filter of claim 1 further comprising:
$d_{10} \geq 10$ μm,
$d_{50}$ of between 15 and 30 μm, and
$d_{90} \leq 45$ μm
wherein $d_{10}$ is a pore size wherein 10% of the pore volume has a smaller pore diameter, $d_{50}$ is a median pore size wherein 50% of the pore volume has a smaller pore diameter, and $d_{90}$ is a pore size wherein 90% of the pore volume has a smaller pore diameter.

7. The porous ceramic honeycomb filter of claim 1 wherein the material comprises cordierite and $d_f \leq 0.38$, wherein $$d_f = (d_{50} - d_{10})/d_{50}$$

$d_{10}$ is a pore size where 10% of the pore volume has a smaller pore diameter, and
$d_{50}$ is a median pore size where 50% of the pore volume has a smaller pore diameter.

8. The porous ceramic honeycomb filter of claim 7 further comprising $d_f \leq 0.35$.

9. The porous ceramic honeycomb filter of claim 7 further comprising $d_f \leq 0.30$.

10. The porous ceramic honeycomb filter of claim 7 further comprising $d_f \leq 0.28$.

11. The porous ceramic honeycomb filter of claim 7 further comprising $d_f \leq 0.25$.

12. The porous ceramic honeycomb filter of claim 1 wherein the material comprises cordierite and $d_b \leq 1.00$, wherein $d_b = (d_{90} - d_{10})/d_{50}$
and wherein $d_{10}$ is a pore size wherein 10% of the pore volume has a smaller pore diameter, $d_{50}$ is a median pore size wherein 50% of the pore volume has a smaller pore diameter, and $d_{90}$ is a pore size wherein 90% of the pore volume has a smaller pore diameter.

13. The porous ceramic honeycomb filter of claim 12 further comprising $d_b \leq 0.90$.

14. The porous ceramic honeycomb filter of claim 12 further comprising $d_b \leq 0.85$.

15. The porous ceramic honeycomb filter of claim 12 further comprising $d_b \leq 0.75$.

16. The porous ceramic honeycomb filter of claim 1 comprising a total porosity (P) wherein $P \geq 40\%$.

17. The porous ceramic honeycomb filter of claim 16 comprising $P \leq 65\%$.

18. The porous ceramic honeycomb filter of claim 16 comprising $P \leq 55\%$.

19. The porous ceramic honeycomb filter of claim 1, comprising:
a porosity attributable to pores having a pore size less than 10 μm is less than 6%, and the porosity being attributable to pores having a pore size larger than 50 μm is less than 8%.

20. The porous ceramic honeycomb filter of claim 1 further comprising a plurality of parallel cell channels separated by porous walls wherein at least some of the parallel cell channels include end plugs.

21. The porous ceramic honeycomb filter of claim 1 further comprising a coefficient of thermal expansion (22-800° C.) of less than or equal to $5.0 \times 10-7/°$ C.

22. The porous ceramic honeycomb filter of claim 1 further comprising a median pore diameter, $d_{50}$, of between 13 and 33 μm wherein $d_{50}$ is a median pore diameter where 50% of a pore volume of the distribution has a smaller pore diameter.

23. The porous ceramic honeycomb filter of claim 1 wherein no more than 1.0% of a total pore volume of the pore size distribution has a pore diameter of less than or equal to 8.0 microns and the porous ceramic honeycomb filter further comprises a
porosity (P) wherein $P < 55\%$.

24. The porous ceramic honeycomb filter of claim 1 wherein the pores are formed, at least in part, by burning out a pore former, wherein said pore former is a single-mode starch.

25. The porous ceramic honeycomb filter of claim 24 wherein the pore former is selected from a group consisting of canna starch, sago palm starch, green mung bean starch, and a single-mode potato starch.

26. The porous ceramic honeycomb filter of claim 1 wherein the oxide-based ceramic material comprises aluminum titanate.

27. The porous ceramic honeycomb filter of claim 26 further comprising $d_f \leq 0.25$ wherein $$d_f = (d_{50} - d_{10})/d_{50}$$

and wherein $d_{10}$ is a pore size where 10% of the pore volume has a smaller pore diameter, and
$d_{50}$ is a median pore size where 50% of the pore volume has a smaller pore diameter.

28. The porous ceramic honeycomb filter of claim 26 further comprising $d_b \leq 0.9$, wherein $d_b = (d_{90} - d_{10})/d_{50}$
and wherein $d_{10}$ is a pore size wherein 10% of the pore volume has a smaller pore diameter,
$d_{50}$ is a median pore size wherein 50% of the pore volume has a smaller pore diameter, and
$d_{90}$ is a pore size wherein 90% of the pore volume has a smaller pore diameter.

29. A honeycomb green body, comprising:
a mixture of inorganic source materials selected from the group of magnesia sources, alumina sources, and silica sources, and a pore former having a particle size distribution with $d_{ps} \leq 0.90$ such that, when the mixture of inorganic source materials are fired to produce a porous ceramic honeycomb, no more than 1.0% of a total pore volume of the porous ceramic honeycomb has a pore diameter of less than or equal to 7.0 microns,
wherein $d_{ps} = \{(dp_{90} - dp_{10})/dp_{50}\}$ and the green body includes a honeycomb structure with a plurality of parallel channels and wherein $dp_{10}$ is a particle size wherein 10% of the particle volume has a smaller particle diameter, $dp_{50}$ is a median particle size wherein 50% of the particle volume has a smaller particle diameter, and $dp_{90}$ is a particle size wherein 90% of the particle volume has a smaller particle diameter.

30. A honeycomb green body of claim 29, further comprising $d_{ps} \leq 0.85$.

31. A honeycomb green body of claim 29, further comprising $d_{ps} \leq 0.80$.

32. A honeycomb green body of claim 29, wherein the median particle size, $dp_{50}$, of the pore former is between 20 μm and 50 μm.

33. The honeycomb green body of claim 29 wherein the pore former is a single-mode starch.

34. The honeycomb green body of claim 29 wherein the pore former is selected from a group of starches consisting of canna starch, sago palm starch, green mung bean starch, and single-mode potato starch.

35. The green body of claim 29 wherein the pore former is canna starch.

36. The green body of claim 29 wherein the pore former is sago palm starch.

37. The green body of claim 29 wherein the pore former is green mung bean starch.

38. The green body of claim 29 wherein the pore former is single-mode potato starch.

39. The green body of claim 29 wherein the pore former comprises between 5-30 wt. % of the inorganic materials.

40. The green body of claim 39 wherein the pore former comprises between 5-15 wt. % of the inorganic materials.

41. A batch mixture for a forming a porous ceramic honeycomb article, comprising:
a mixture of inorganic source materials and a pore former, wherein the pore former has a particle size distribution with $d_{ps} \leq 0.90$ such that, when the mixture of inorganic source materials are fired to produce a porous ceramic honeycomb, no more than 1.0% of a total pore volume of the porous ceramic honeycomb has a pore diameter of less than or equal to 7.0 microns,
wherein $d_{ps}=(dp_{90}-dp_{10})/dp_{50}$
and wherein $dp_{10}$ is a particle size wherein 10% of the particle volume has a smaller particle size, $dp_{50}$ is a median particle size wherein 50% of the particle volume has a smaller particle size, and $dp_{90}$ is a particle size wherein 90% of the particle volume has a smaller particle size.

42. The batch of claim 41 further comprising $d_{ps} \leq 0.85$.

43. The batch of claim 41 further comprising $d_{ps} \leq 0.80$.

44. The batch of claim 41 wherein the pore former is a single-moded.

45. The batch of claim 41 wherein the pore former is a starch.

46. The batch of claim 45 wherein the starch is selected from a group consisting of canna starch, sago palm starch, green mung bean starch, and single-mode potato starch.

47. The batch of claim 46 wherein the starch has a median particle size, $dp_{50}$, of the pore former is between 20 μm and 50 μm.

48. The batch of claim 41 wherein the pore former comprises between 5-30 wt. % of the inorganic source materials.

49. A porous ceramic honeycomb filter, comprising:
a cordierite-containing ceramic body, the body having an inlet end and an outlet end, and a multiplicity of cell channels at least partially defined by porous cell walls, said walls extending from the inlet end to the outlet end, wherein some of the cell channels are plugged, said porous cell wall including a material with many pores and having a pore size distribution wherein no more than 1.0% of a total pore volume of the pore size distribution has a pore diameter of less than or equal to 7.0 microns and $d_b \leq 1.00$, wherein $d_b=(d90-d10)/d50$
wherein
$d_{10}$ is a pore size wherein 10% of the pore volume has a smaller pore diameter,
$d_{50}$ is a median pore size wherein 50% of the pore volume has a smaller pore diameter, and
$d_{90}$ is a pore size wherein 90% of the pore volume has a smaller pore diameter.

50. The porous ceramic honeycomb filter claim 49 further comprising $d_b \leq 0.90$.

51. The porous ceramic honeycomb filter of claim 49 further comprising $d_b \leq 0.85$.

52. The porous ceramic honeycomb filter of claim 49 further comprising $d_b \leq 0.75$.

53. The porous ceramic honeycomb filter of claim 51 comprising a total porosity (P) wherein $P \geq 40\%$.

54. The porous ceramic honeycomb filter of claim 53 further comprising:
porosity (P) wherein $P \leq 55\%$.

55. The porous ceramic honeycomb filter of claim 53 further comprising a coefficient of thermal expansion (22-800° C.) of less than $10.0 \times 10^{-7}/°C$.

56. The porous ceramic honeycomb filter of claim 55 further comprising a coefficient of thermal expansion (22-800° C.) of less than or equal to $5.0 \times 10^{-7}/°C$.

57. The porous ceramic honeycomb filter of claim 55 further comprising a coefficient of thermal expansion (22-800° C.) of less than or equal to $4.0 \times 10^{-7}/°C$.

58. The porous ceramic honeycomb filter of claim 49 wherein no more than 1.0% of the total pore volume of the pore size distribution has a pore diameter of less than or equal to 8.0 microns.

59. The porous ceramic honeycomb filter of claim 53 wherein the material comprises $d_f \leq 0.38$, wherein $d_f=(d_{50}-d_{10})/d_{50}$
and wherein $d_{10}$ is a pore size wherein 10% of the pore volume has a smaller pore diameter, and $d_{50}$ is a median pore size wherein 50% of the pore volume has a smaller pore diameter.

60. The porous ceramic honeycomb filter of claim 59 further comprising $d_f \leq 0.35$.

61. The porous ceramic honeycomb filter of claim 59 further comprising $d_f \leq 0.30$.

62. The porous ceramic honeycomb filter of claim 59 further comprising $d_f \leq 0.28$.

63. The porous ceramic honeycomb filter of claim 59 further comprising $d_f \leq 0.25$.

64. The porous ceramic honeycomb filter of claim 49 further comprising:
$d_{10} \geq 10$ μm,
$d_{50}$ of between 13 and 33 μm, and
$d_{90} \leq 45$ μm
wherein $d_{10}$ is a pore size wherein 10% of the pore volume has a smaller pore diameter, $d_{50}$ is a median pore size wherein 50% of the pore volume has a smaller pore diameter, and $d_{90}$ is a pore size wherein 90% of the pore volume has a smaller pore diameter.

65. The porous ceramic honeycomb filter of claim 64 wherein $d_{10} \geq 12$ microns.

66. The porous ceramic honeycomb filter of claim 64 wherein $d_{90} \leq 35$ microns.

67. The porous ceramic honeycomb filter of claim 64 wherein $d_{50}$ is between 15 microns and 30 microns.

68. The porous ceramic honeycomb filter of claim 64 wherein $d_{50}$ is between 15 microns and 25 microns.

69. The porous ceramic honeycomb filter of claim 49 wherein a porosity attributable to pores having a pore size less than 10 μm is less than 6%.

70. The porous ceramic honeycomb filter of claim 49 wherein a porosity being attributable to pores having a pore size larger than 50 μm is less than 8%.

* * * * *